(12) United States Patent
Sueyoshi et al.

(10) Patent No.: US 8,621,126 B2
(45) Date of Patent: Dec. 31, 2013

(54) COMMUNICATION DEVICE, COMMUNICATION SCHEME DETERMINATION METHOD, AND PROGRAM

(75) Inventors: Masahiro Sueyoshi, Kanagawa (JP); Hiroshi Okada, Kanagawa (JP); Naoki Miyabayashi, Tokyo (JP); Yoshihiro Yoneda, Tokyo (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 12/829,673

(22) Filed: Jul. 2, 2010

(65) Prior Publication Data

US 2011/0022755 A1 Jan. 27, 2011

(30) Foreign Application Priority Data

Jul. 24, 2009 (JP) ................................ 2009-173116

(51) Int. Cl.
*G06F 13/00* (2006.01)
*H04B 5/00* (2006.01)
*H04B 7/00* (2006.01)

(52) U.S. Cl.
USPC .......................... 710/109; 455/41.2; 455/41.4

(58) Field of Classification Search
USPC ................... 710/109; 455/41.1, 41.2
See application file for complete search history.

(56) References Cited

U.S. PATENT DOCUMENTS 6,212,594 B1 * 4/2001 Schindler ....................... 710/266
6,965,948 B1 * 11/2005 Eneborg et al. ............... 709/250
7,917,143 B2 * 3/2011 Jiao et al. ..................... 455/435.1
8,126,433 B2 * 2/2012 Haartsen ........................ 455/411
8,131,214 B2 * 3/2012 Braun et al. .................. 455/41.1
8,140,010 B2 * 3/2012 Symons et al. ............... 455/41.1
2006/0084417 A1 4/2006 Melpignano et al.
2009/0215397 A1 * 8/2009 Thorn et al. .................. 455/41.2
2010/0311331 A1 * 12/2010 Hirose ........................... 455/41.2
2012/0100807 A1 * 4/2012 Nakagawa .................... 455/41.2

FOREIGN PATENT DOCUMENTS

JP 2005-532759 10/2005

OTHER PUBLICATIONS

Timer ECE520, 2005.*

* cited by examiner

*Primary Examiner* — Paul R Myers
*Assistant Examiner* — Christopher A Daley
(74) *Attorney, Agent, or Firm* — Oblon, Spivak, McClelland, Maier & Neustadt, L.L.P.

(57) ABSTRACT

Provided is a communication device including a first communication unit that is capable of sending a polling-signal in a specific polling cycle and receiving a response-signal sent from a counterpart device in response to the polling-signal, based on a first scheme, a second communication unit that is capable of sending a polling-signal in a longer polling cycle than the first communication unit and receiving a response-signal sent from the counterpart device in response to the polling-signal, based on a second scheme, and a scheme determination unit that waits for reception of the response-signal by the second or the first communication unit for a specific period of time longer than the polling cycle of the second communication unit with a time of the response-signal being received by the first or the second communication unit as a reference, and determines a scheme usable by the counterpart device based on the reception result.

13 Claims, 22 Drawing Sheets

FIG.3A

PARALLEL POLLING SCHEME

| Target \ Initiator | NFC ONLY | JET ONLY | NFC+JET |
|---|---|---|---|
| NFC ONLY | ○ | — | ○ |
| JET ONLY | — | ○ | ○ |
| NFC+JET | ○ | ○ | ○ |

FIG.3B

SERIAL POLLING SCHEME

| Target \ Initiator | NFC ONLY | JET ONLY | NFC+JET |
|---|---|---|---|
| NFC ONLY | ○ | — | ○ |
| JET ONLY | — | ○ | × |
| NFC+JET | ○ | × | ○ |

Time chart (WHERE NFC: "1", JET: "1")

FIG.20

EXAMPLE OF DATABASE STRUCTURE OF LIBRARY

| TYPE OF WIRELESS COMMUNICATION | Target INFORMATION | | | ID INFORMATION (Application NAME ASSOCIATED WITH Target INFORMATION) |
|---|---|---|---|---|
| | System Code | Service Code 1 | Service Code 2 | |
| NFC (Felica) | 1234 | 20XX | 21XX | ex.) APPLICATION A FOR IMAGE TRANSFER |
| NFC (Type-A) | 1256 | 30XX | 31XX | ex.) APPLICATION B FOR IMAGE TRANSFER |
| NFC (Type-B) | 4321 | 40XX | 41XX | ex.) APPLICATION C FOR IMAGE TRANSFER |
| Transfer Jet | 5678 | 50XX | 51XX | ex.) APPLICATION D FOR FILE SHARING |

COMMUNICATION DEVICE, COMMUNICATION SCHEME DETERMINATION METHOD, AND PROGRAM

BACKGROUND OF THE INVENTION

Field of the Invention

The present invention relates to a communication device, a communication scheme determination method, and a program.

In recent years, a non-contact IC (Integrated Circuit) card or a mobile phone with a non-contact IC card function (hereinafter, a non-contact IC card or the like) has come to be used in various situations. For example, the non-contact IC card or the like is used daily for a ticket gate service of a transportation facility, a settlement service provided at the time of purchase of goods, or the like. Such non-contact IC card or the like is provided with communication means that uses a wireless communication technology called "proximity communication". The proximity communication here means wireless communication performed by bringing two devices that are the targets of the communication into proximity with each other. As a proximity communication scheme, there is NFC (Near Field Communication) standardized as ISO 18092, for example. Furthermore, different communication schemes are defined for NFC, such as Type-A, Type-B and FeliCa (registered trademark of Sony Corporation) scheme.

Furthermore, lately, a proximity communication scheme different from NFC is also proposed. For example, a proximity communication scheme called TransferJet (hereinafter, JET) that enables faster data transfer than NFC between two devices that are in proximity with each other is proposed. NFC and JET hardly interfere with each other due to the differences in the frequency bands that are used, the transmission power, and the like. Accordingly, proximity communication means of both schemes can coexist in one device (refer to FIG. 1). Thus, a technology for making NFC and JET coexist in one device and for further improving the convenience of a user by making good use of the advantage of each scheme is earnestly developed.

When a plurality of communication means coexist in one device, it becomes necessary to switch the communication schemes (communication means) in accordance with the type of communication means of a counterpart device, or to determine, for communication efficiency, a communication scheme (communication means) that is to be used preferentially according to the counterpart device. A method of selectively switching communication means (network interface) is disclosed in JP-A-2005-532759, for example. This patent document discloses a method of monitoring the hot-swap of a network interface, and of selecting the type of a network interface to be used according to a specific network interface selection policy. Furthermore, this patent document discloses a method of automatically connecting to a selected network interface.

SUMMARY OF THE INVENTION

According to the technology disclosed in the above-described patent document, a wireless terminal that uses a so-called wireless LAN (Local Area Network) selects the type of a wireless interface so that it matches the wireless scheme of a wireless base station that it accessed at the time of starting communication. Accordingly, the situation assumed for the wireless communication of the patent document and the situation assumed for proximity communication are different. In the case of the proximity communication, it is possible that both a device that is placed under (hereinafter, an initiator device) and a device that is placed over (hereinafter, a target device) are compatible with NFC and JET.

Of course, it is also possible that the initiator device is compatible with one of NFC and JET, and the target device is compatible with both NFC and JET. On the contrary, it is also possible that the initiator device is compatible with both NFC and JET, and the target device is compatible with one of NFC and JET. Accordingly, a method becomes necessary that enables both the initiator device and the target device to recognize a usable communication scheme at the time the target device is placed over (refer to FIGS. 1 and 2).

In light of the foregoing, it is desirable to provide a communication device, a communication scheme determination method, and a program that are novel and improved, and that enable to determine a communication scheme that can be used between two devices that perform proximity communication.

According to an embodiment of the present invention, there is provided a communication device which includes a first communication unit that is capable of sending a polling signal in a specific polling cycle and receiving a response signal sent from a counterpart device in response to the polling signal, based on a first scheme, a second communication unit that is capable of sending a polling signal in a longer polling cycle than the first communication unit and receiving a response signal sent from the counterpart device in response to the polling signal, based on a second scheme, and a scheme determination unit that waits for reception of the response signal by the second or the first communication unit for a specific period of time longer than the polling cycle of the second communication unit with a time point of the response signal being received by the first or the second communication unit as a reference, and determines a scheme usable by the counterpart device based on the reception result.

Furthermore, the communication device may further include an operation control unit that stops operation of the first or the second communication unit compatible with a scheme not usable by the counterpart device, in case the scheme usable by the counterpart device is determined by the scheme determination unit to be one of the first and the second schemes.

Furthermore, the communication device may further include a display unit that displays information about the scheme usable by the counterpart device based on a determination result of the scheme determination unit.

Furthermore, the scheme determination unit may wait, in case the response signal is received by the first communication unit, for reception of the response signal by the second communication unit for the specific period of time with a time point of the reception of the response signal by the first communication unit as a reference, determine, in case the response signal is received by the second communication unit, that the schemes usable by the counterpart device are the first and the second schemes, and determine, in case the response signal is not received by the second communication unit, that the scheme usable by the counterpart device is the first scheme only.

Furthermore, the scheme determination unit may wait, in case the response signal is received by the second communication unit, for reception of the response signal by the first communication unit for the specific period of time with a time point of the reception of the response signal by the second communication unit as a reference, determine, in case the response signal is received by the first communication unit, that the schemes usable by the counterpart device are the first and the second schemes, and determine, in case the response signal is not received by the first communication unit, that the scheme usable by the counterpart device is the second scheme only.

Furthermore, the first scheme may be a NFC (Near Field Communication) scheme, and the second scheme may be a TransferJet scheme.

Furthermore, the communication device may further include a launcher starting unit that starts a first-scheme launcher that is for starting an application compatible with the first scheme or a second-scheme launcher that is for starting an application compatible with the second scheme, depending on a determination result of the scheme determination unit.

Furthermore, the communication device may further include a third communication unit that is capable of sending a polling signal in a longer polling cycle than the second communication unit and receiving a response signal sent from the counterpart device in response to the polling signal, based on a third scheme. In this case, the scheme determination unit waits for reception of the response signal by the first communication unit, the second communication unit and the third communication unit for a specific period of time longer than the polling cycle of the third communication unit with a time point of the response signal being received by any of the first communication unit, the second communication unit and the third communication unit as a reference, and determines a scheme usable by the counterpart device based on the reception result.

According to another embodiment of the present invention, there is provided a communication scheme determination method which includes the steps of sending a polling signal of a first scheme in a specific polling cycle and sending a polling signal of a second scheme in a longer polling cycle than the first scheme, receiving a response signal of the first or the second scheme sent from a counterpart device in response to the polling signals sent in the step of sending, and waiting for reception of the response signal of the second or the first scheme for a specific period of time longer than the polling cycle of the second scheme with a time point of the response signal of the first or the second scheme being received in the step of receiving as a reference, and determining a scheme usable by the counterpart device based on the reception result.

According to another embodiment of the present invention, there is provided a program for causing a computer to realize a sending function of sending a polling signal of a first scheme in a specific polling cycle and sending a polling signal of a second scheme in a longer polling cycle than the first scheme, a receiving function of receiving a response signal of the first or the second scheme sent from a counterpart device in response to the polling signals sent by the sending function, and a scheme determination function of waiting for reception of the response signal of the second or the first scheme for a specific period of time longer than the polling cycle of the second scheme with a time point of the response signal of the first or the second scheme being received by the receiving function as a reference, and determining a scheme usable by the counterpart device based on the reception result.

According to another embodiment of the present invention, there is provided a recording medium in which the program is recorded, the recording medium being able to be read by a computer.

According to the embodiments of the present invention described above, a communication scheme that can be used between two devices that perform proximity communication can be determined.

BRIEF DESCRIPTION OF THE DRAWINGS

FIG. 3A is an explanatory diagram showing combinations of proximity communication schemes that can be realized with a counterpart device in case of adopting a parallel polling scheme;

FIG. 3B is an explanatory diagram showing combinations of proximity communication schemes that can be realized with a counterpart device in case of adopting a serial polling scheme;

FIG. 20 is an explanatory diagram showing an example of a database structure of a library included in the software stack configuration of the initiator device according to the embodiment;

DETAILED DESCRIPTION OF THE EMBODIMENT(S)

Figure 1:
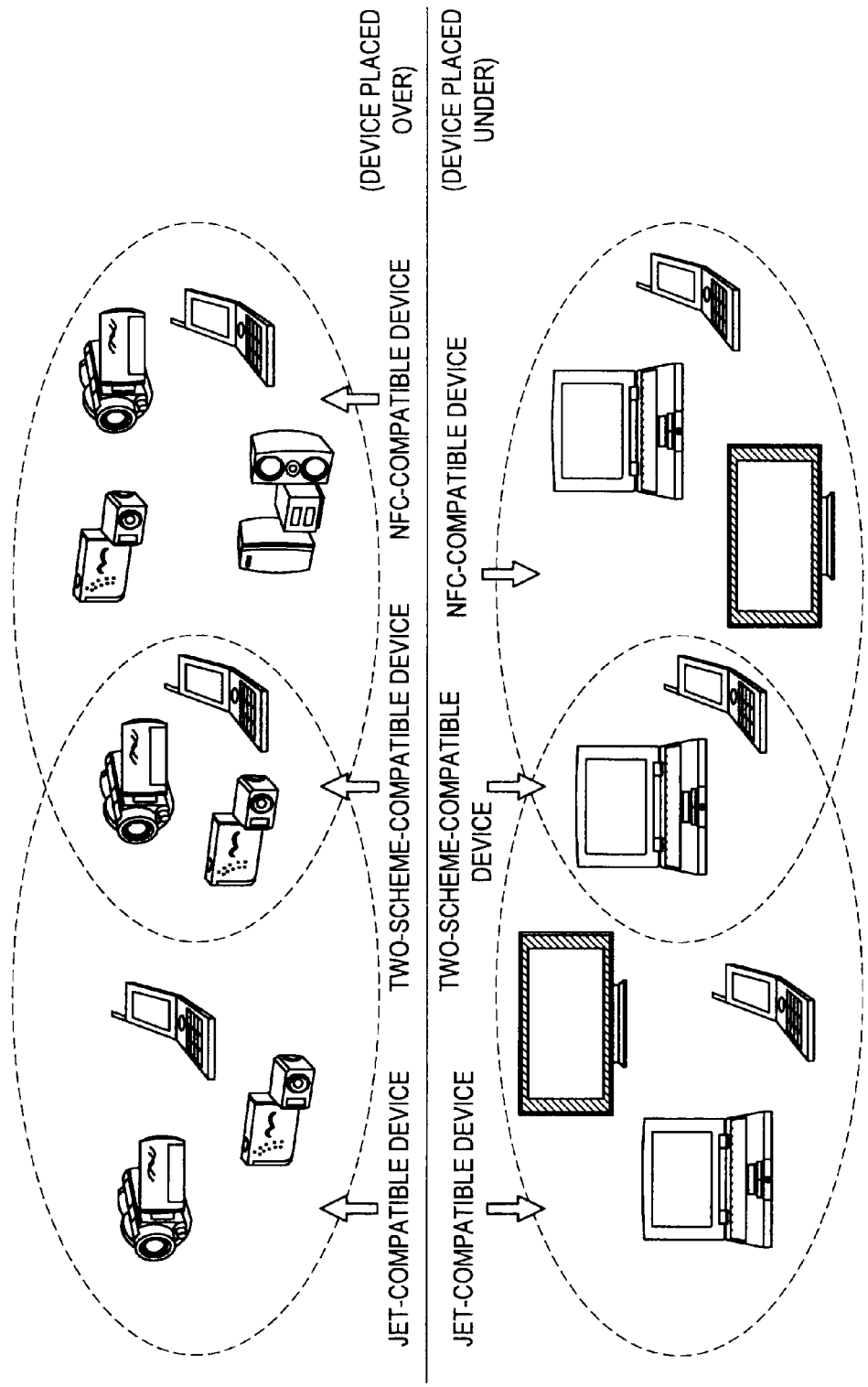
FIG. 1 is an explanatory diagram showing a plurality of proximity communication schemes and examples of devices compatible with these proximity communication schemes.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

Figure 2:
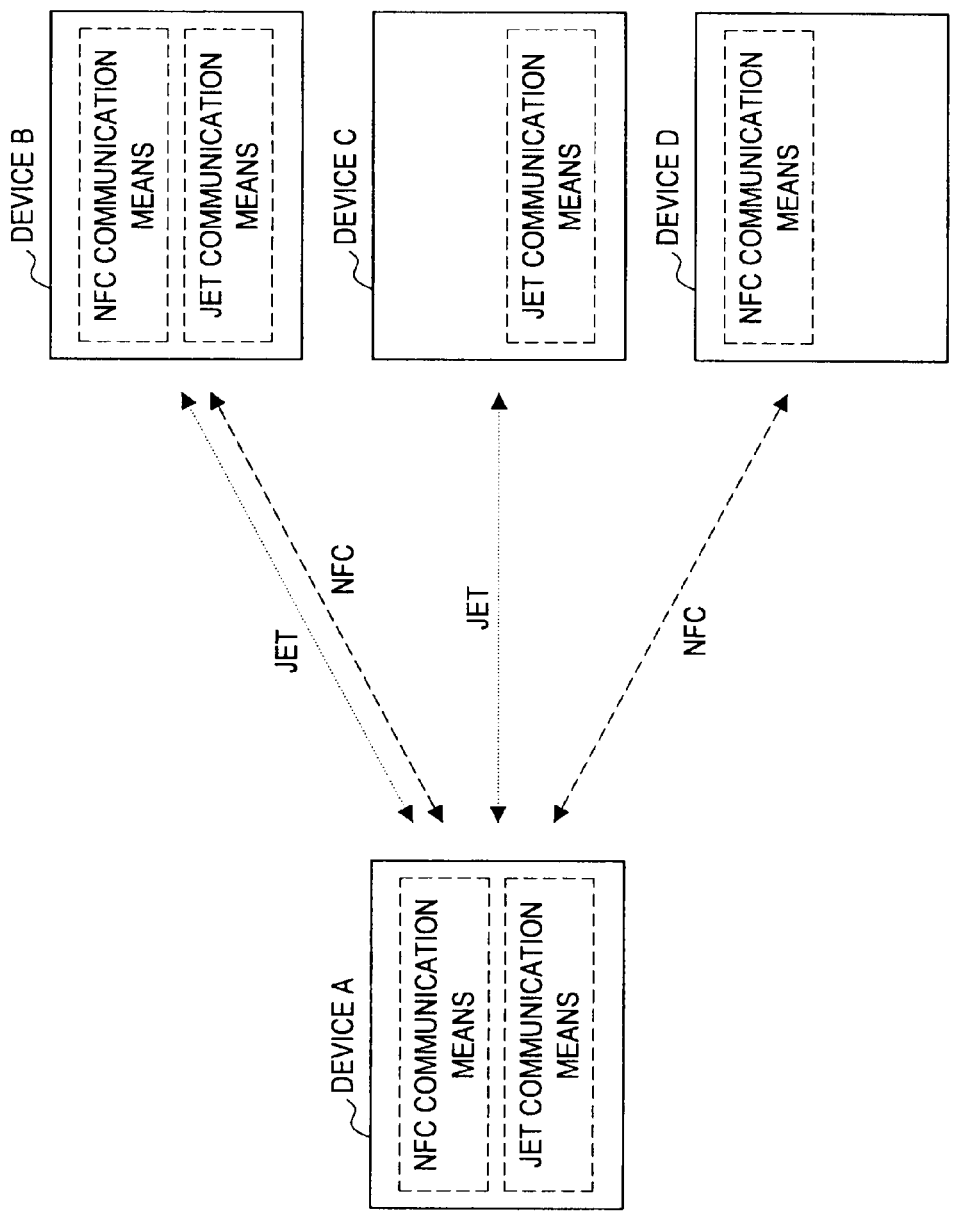
FIG. 2 is an explanatory diagram showing modes of communication between a device compatible with a plurality of proximity communication schemes and counterpart devices that are compatible with one or both of the proximity communication schemes.

The flow of description of an embodiment of the present invention described below will be briefly mentioned here. First, the characteristics of a proximity communication scheme will be described, taking NFC and JET as examples. Next, concrete examples of devices provided with proximity communication means will be described with reference to FIGS. 1 and 2. Then, polling schemes to be used in proximity communication will be described with reference to FIGS. 3A and 3B. Then, examples of a system configuration of a proximity communication system configured from an initiator device and a target device will be introduced with reference to FIGS. 4 to 8.

Next, a configuration example of an initiator device according to the present embodiment will be described with reference to FIG. 9. Then, a determination method of a proximity communication scheme by the initiator device of the present embodiment will be described with reference to FIG. 10. Then, the change over time in signals that are output in the determination process of the proximity communication scheme by the initiator device of the present embodiment and the change in the status of a timer will be described with reference to FIGS. 11 to 13.

Then, a configuration example of the target device according to the present embodiment will be described with reference to FIG. 14. Then, a determination method of a proximity communication scheme by the target device of the present embodiment will be described with reference to FIG. 15. Then, the change over time in signals that are output in the determination process of the proximity communication scheme by the target device of the present embodiment and the change in the status of a timer will be described with reference to FIGS. 16 to 18.

Next, a software stack configuration of the initiator device according to the present embodiment will be described with reference to FIGS. 19 and 20. Then, a flow of an activation process of a launcher and an application included in the software stack configuration of the initiator device according to the present embodiment will be described with reference to FIG. 21. Then, an example of a hardware configuration that is capable of realizing the determination process of the proximity communication scheme, the launcher activation process, the application activation process, and the like, by the initiator device according to the present embodiment will be described with reference to FIG. 22.

(Description Items)
1: Proximity Communication Scheme
    1-1: Outline of NFC
    1-2: Outline of JET
    1-3: Comparison between NFC and JET
    1-4: Polling Scheme
    1-4-1: Parallel Polling Scheme
    1-4-2: Serial Polling Scheme
2: Embodiment
    2-1: System Configuration Example
        2-1-1: Two-Scheme Initiator+Two-Scheme Target
        2-1-2: Two-Scheme Initiator+One-Scheme Target
        2-1-3: One-Scheme Initiator+Two-Scheme Target
    2-2: Configuration of Initiator Device
    2-3: Proximity Communication Scheme Determination Method
    2-4: Time Chart
        2-4-1: (Case 1) NFC Detected+JET Detected
        2-4-2: (Case 2) NFC Detected+JET Non-Detected
        2-4-3: (Case 3) NFC Non-Detected+JET Detected
    2-5: Configuration of Target Device
    2-6: Proximity Communication Scheme Determination Method
    2-7: Time Chart
        2-7-1: (Case 1) NFC Detected+JET Detected
        2-7-2: (Case 2) NFC Detected+JET Non-Detected
        2-7-3: (Case 3) NFC Non-Detected+JET Detected
    2-8: Software Stack Configuration
    2-9: Hardware Configuration Example
    <1: Proximity Communication Scheme>

First, before describing an embodiment according to the present invention, an outline of a proximity communication scheme will be described. Here, for the sake of explanation, NFC and JET are set forth as examples of the proximity communication scheme. However, the application scope of the technology according to the present embodiment is not limited to these examples.

<1-1: Outline of NFC>

First, an outline of NFC will be described. NFC is literally a scheme for realizing non-contact communication between an initiator device and a target device that are brought within about 10 cm of each other. Presently, NFC is widely spread as a communication scheme used at the time of a reader/writer (the initiator device) reading/writing data stored in a non-contact IC card or the like (the target device). Particularly, NFC is used at the time of reading/writing electronic money data, authentication data, or the like, stored in the non-contact IC card or the like. Accordingly, a device compatible with NFC is provided with a security mechanism such as a tamper-resistant memory, encryption means, authentication means, or the like. Also, power can be provided/supplied by using NFC.

<1-2: Outline of JET>

Next, an outline of JET will be described. As with NFC, JET is a scheme for realizing non-contact communication between an initiator device and a target device that are brought into proximity with each other. However, the communicable distance by JET is shorter than that of NFC. Accordingly, in the case of using JET, the devices have to be brought closer to each other than in the case of using NFC. Furthermore, provisions relating to security, such as those provided for NFC, are not defined for JET. Furthermore, unlike NFC, provision/supply of power is not enabled by the use of JET. However, since JET performs communication by using a spread spectrum system, the data transfer rate is extremely high compared to NFC. Thus, a mode of using a device compatible with JET as an external memory device or the like is assumed.

<1-3: Comparison Between NFC and JET>

As described above, NFC and JET have different characteristics from each other. Particularly large differences are the presence/absence of a security mechanism, the data transfer rate, and the feasibility of power supply. These differences serve as motivations for clearly separating the NFC use case and the JET use case. Furthermore, in addition to the above-described, there are a difference in carrier frequencies and a difference in polling cycles between NFC and JET. According to NFC, data is transferred in a frequency band having a central frequency of 13.56 MHz; and according to JET, data is transferred in a frequency band having a central frequency of 4.48 GHz. Accordingly, even if they are made to coexist, interference does not occur because the frequency bands that are used are distinctly separated from each other. Also, regarding the difference in the polling cycles, there are characteristics that the polling cycle of NFC is relatively short, and the polling cycle of JET is relatively long.

<1-4: Polling Scheme>

As has been described, NFC and JET are technologies that can coexist with each other. Accordingly, both the initiator device and the target device may be NFC-compatible, JET-compatible, or compatible with both (hereinafter, compatibility with both NFC and JET may sometimes be referred to as "two-scheme") (refer to FIG. 1). Accordingly, a function for appropriately determining the scheme with which a counterpart device is compatible is desired of a two-scheme compatible device (for example, a device A in FIG. 2). In the embodiment described later, a method of detecting a compatible scheme of the counterpart device by using the difference in the polling cycles of NFC and JET will be proposed. Thus, first, the polling scheme used by NFC and JET will be briefly described.

Additionally, the polling here is the act of sending a polling signal from the initiator device to the target device, and the act of sending back a response signal from the target device to the initiator device in response to the polling signal. This polling is performed at the time of starting data transmission/reception between the initiator device and the target device to assess the preparation state of each device, or to synchronize the processes. Also, the polling signal is intermittently sent at a specific polling cycle. Here, the polling cycle ($T_{NFC}$) of NFC and the polling cycle ($T_{JET}$) of JET are different from each other, and there is a relation of $T_{NFC} < T_{JET}$.

Now, in the case of a device compatible with both NFC and JET, what order of transmission of an NFC polling signal and a JET polling signal would be desirable? In relation to this point, the following two types of polling scheme will be considered.

(1-4-1: Parallel Polling Scheme)

The first is a parallel polling scheme. A parallel polling scheme is a scheme for sending the NFC polling signal and the JET polling signal in parallel. In the case of the parallel polling scheme, the NFC polling signal and the JET polling signal are sent in parallel, and thus, even when the target device is NFC-compatible or JET-compatible or compatible with both NFC and JET, the initiator device can obtain a response signal. However, since the polling cycle of NFC and the polling cycle of JET are different from each other, a waiting time for the response signal has to be set according to the polling cycle of JET that is relatively long.

Additionally, the correspondence relationship between the initiator device (Initiator) and the target device (Target) in the parallel polling scheme will be as shown in FIG. 3A. For example, according to the parallel polling scheme, in case the initiator device is compatible with both NFC and JET (NFC+JET), the initiator device can obtain a response signal regardless of whether the target device is NFC-compatible (NFC only), or JET-compatible (JET only), or compatible with both (NFC+JET) (○).

Furthermore, a case where the initiator device is NFC-compatible (NFC only) and a case where it is JET-compatible (JET only) are also shown in FIG. 3A for reference. As a matter of course, in case the initiator device is NFC-compatible (NFC only), the initiator device is not able to obtain a response signal from a target device that is JET-compatible (JET only) (−). Also, in case the initiator device is JET-compatible (JET only), the initiator device is not able to obtain a response signal from a target device that is NFC-compatible (NFC only) (−).

(1-4-2: Serial Polling Scheme)

The second is a serial polling scheme. A serial polling scheme is a scheme for performing the NFC polling and the JET polling in turn. First, the initiator device performs polling by using an NFC polling signal, and decides during the polling whether the target device is compatible with JET. In case the target device is compatible with JET, the initiator device performs polling by using a JET polling signal. As such, in the case of the serial polling scheme, negotiation that uses polling by NFC is necessary, and thus there is an issue that communication is not possible with a target device not loaded with NFC (refer to FIG. 3B).

<2: Embodiment>

In the following, an embodiment of the present invention will be described.

<2-1: System Configuration Example>

As described above, as a polling scheme that can be used by a device compatible with both NFC and JET, there are the parallel polling scheme and the serial polling scheme. However, in the case of the serial polling scheme, there is an issue that, if the target device is not compatible with NFC, it is not possible to determine the compatible scheme of the target device. Accordingly, the parallel polling scheme according to which the compatible scheme of the target device can be determined even if it is not compatible with NFC is desirable. Thus, in the present embodiment, an explanation will be given with the parallel polling scheme as the premise.

Here, a system configuration example of a proximity communication system that is compatible with the parallel polling scheme and that includes the initiator device and the target device will be described. The system configuration shown here is a combination example where at least one of the initiator device and the target device is a device compatible with both NFC and JET.

(2-1-1: Two-Scheme Initiator+Two-Scheme Target)

Figure 4:
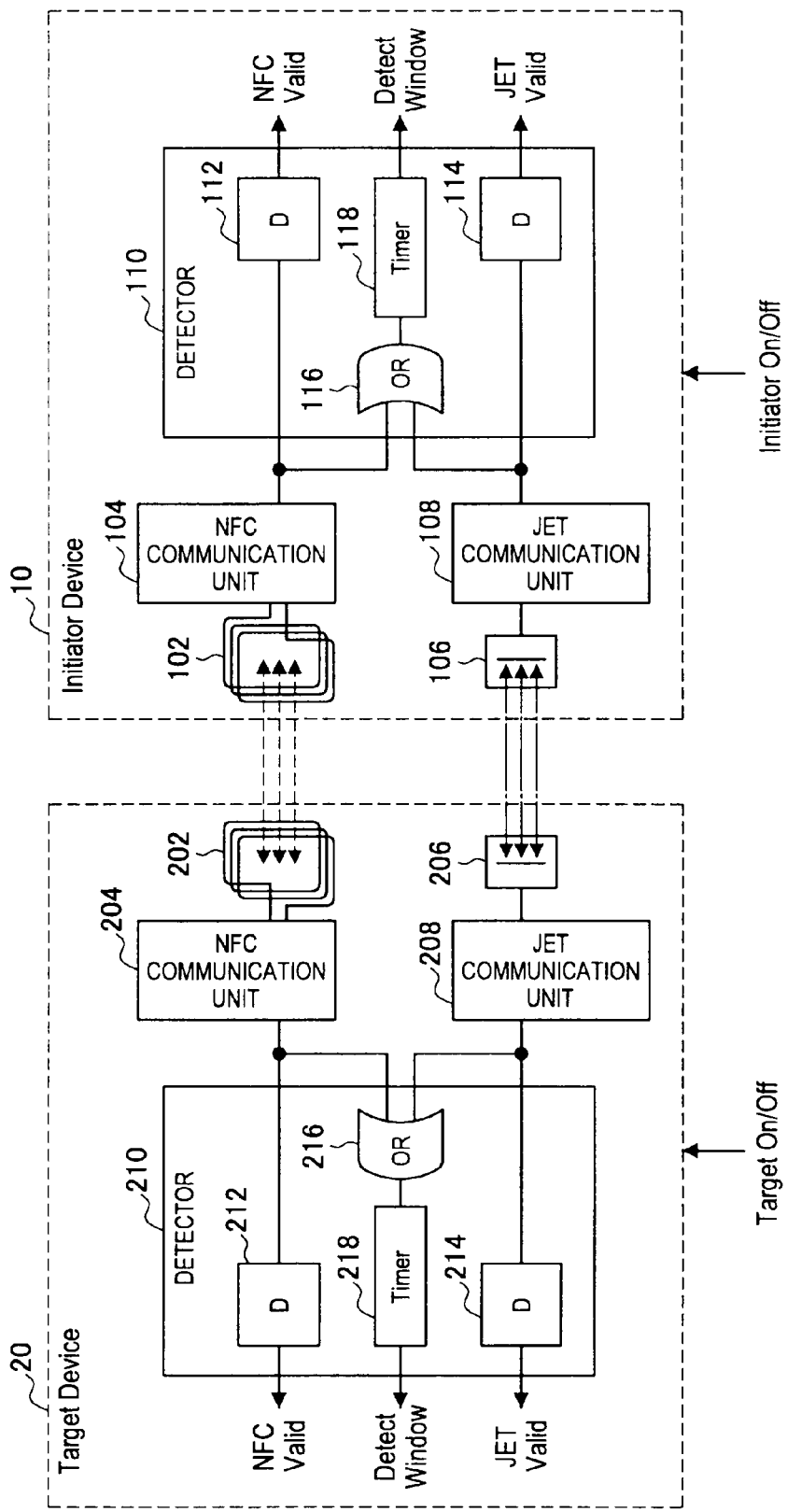
FIG. 4 is an explanatory diagram showing an example of a system configuration including an initiator device and a target device that are compatible with a plurality of proximity communication schemes, and an example of the device configuration of each device.

First, reference will be made to FIG. 4. A system configuration example where an initiator device 10 and a target device 20 are both compatible with both NFC and JET is shown in FIG. 4.

(Initiator Device 10)

First, the configuration of the initiator device 10 will be described. As shown in FIG. 4, the initiator device 10 is configured mainly from an antenna 102 for NFC, an NFC communication unit 104, an antenna 106 for JET, a JET communication unit 108, and a detector 110. Also, the detector 110 includes D flip-flop circuits 112 and 114, an OR circuit 116, and a timer 118.

The antenna 102 for NFC is configured from a loop antenna. When a current flows through the loop antenna, an induced magnetic field is generated. Furthermore, when a loop antenna of a counterpart device is neared to the induced magnetic field, a current is generated in the loop antenna due to electromagnetic induction. That is, the loop antennas are magnetically coupled to each other. When the loop antennas are magnetically coupled to each other, it becomes possible to transmit/receive various signals by using the modulation of current amplitude. Also, the current induced in the loop antenna can be used as a drive current. That is, power can be received via the loop antenna.

The NFC communication unit 104 is means for transmitting a signal to the target device 20 via the antenna 102 for NFC, and for receiving a signal from the target device 20. For example, the NFC communication unit 104 transmits a polling signal (hereinafter, an NFC polling signal) via the antenna 102 for NFC, and receives a response signal (hereinafter, an NFC response signal) sent from the target device 20 in response to the polling signal. The response signal received by the NFC communication unit 104 is input to the D flip-flop circuit 112 and the OR circuit 116 that are included in the detector 110.

The antenna 106 for JET is configured from a coupler element for generating an induced electric field. The induced electric field (a longitudinal wave) generated by this coupler element has a property of being attenuated inversely with the square of distance. Thus, high gain can be obtained at a short distance, but on the other hand, the intensity is drastically reduced as the distance becomes larger. As a result, there is an advantage that other radio waves are not interfered with.

The JET communication unit 108 is means for transmitting a signal to the target device 20 via the antenna 106 for JET, and for receiving a signal from the target device 20. For example, the JET communication unit 108 transmits a polling signal (hereinafter, a JET polling signal) via the antenna 106 for JET, and receives a response signal (hereinafter, a JET response signal) sent from the target device 20 in response to the polling signal. The response signal received by the JET communication unit 108 is input to the D flip-flop circuit 114 and the OR circuit 116 that are included in the detector 110.

As described above, the NFC response signal and the JET response signal are input to the OR circuit 116. In the example of FIG. 4, the target device 20 is compatible with both NFC and JET, and thus both the NFC response signal and the JET response signal are input to the OR circuit 116. However, since the polling cycle of NFC and the polling cycle of JET are different from each other, one is input, and then the other is input. At this time, when one of the response signals is input first, the timer 118 is set to a specific value, and countdown is started. At this time, the specific value is set such that the time until the count 0 is longer than the polling cycle of JET (polling cycle of JET>polling cycle of NFC).

When the count of the timer 118 reaches 0 and the time is out, the NFC response signal or the JET response signal held in the D flip-flop circuit 112, 114 is output. By observing the NFC response signal (NFC Valid) and the JET response signal (JET Valid) output from the D flip-flop circuits 112, 114 in this manner, the compatible scheme of the target device 20 is detected.

(Target Device 20)

Next, the configuration of the target device 20 will be described. As shown in FIG. 4, the target device 20 is mainly configured from an antenna 202 for NFC, an NFC communication unit 204, an antenna 206 for JET, a JET communication unit 208, and a detector 210. Also, the detector 210 includes D flip-flop circuits 212 and 214, an OR circuit 216, and a timer 218.

The antenna 202 for NFC is configured from a loop antenna. When a current flows through the loop antenna, an induced magnetic field is generated. Furthermore, when a loop antenna of a counterpart device is neared to the induced magnetic field, a current is generated in the loop antenna due to electromagnetic induction. That is, the loop antennas are magnetically coupled to each other. When the loop antennas are magnetically coupled to each other, it becomes possible to transmit/receive various signals by using the modulation of current amplitude. Also, the current induced in the loop antenna can be used as a drive current. That is, power can be received via the loop antenna.

The NFC communication unit 204 is means for receiving a signal from the initiator device 10 via the antenna 202 for NFC, and for transmitting a signal to the initiator device 10. For example, the NFC communication unit 204 receives a polling signal (an NFC polling signal) via the antenna 202 for NFC, and transmits a response signal (an NFC response signal) to the initiator device 10 in response to the polling signal. The NFC polling signal received by the NFC communication unit 204 is input to the D flip-flop circuit 212 and the OR circuit 216 that are included in the detector 210.

The antenna 206 for JET is configured from a coupler element for generating an induced electric field. The induced electric field (a longitudinal wave) generated by this coupler element has a property of being attenuated inversely with the square of distance. Thus, high gain can be obtained at a short distance, but on the other hand, the intensity is drastically reduced as the distance becomes larger. As a result, there is an advantage that other radio waves are not interfered with.

The JET communication unit 208 is means for receiving a signal from the initiator device 10 via the antenna 206 for JET, and for transmitting a signal to the initiator device 10. For example, the JET communication unit 208 receives a polling signal (a JET polling signal) via the antenna 206 for JET, and transmits a response signal (a JET response signal) to the initiator device 10 in response to the polling signal. The JET polling signal received by the JET communication unit 208 is input to the D flip-flop circuit 214 and the OR circuit 216 that are included in the detector 210.

As described above, the NFC polling signal and the JET polling signal are input to the OR circuit 216. In the example of FIG. 4, the initiator device 10 is compatible with both NFC and JET, and thus both the NFC polling signal and the JET polling signal are input to the OR circuit 216. However, since the polling cycle of NFC and the polling cycle of JET are different from each other, one is input, and then the other is input. At this time, when one of the polling signals is input first, the timer 218 is set to a specific value, and countdown is started. At this time, the specific value is set such that the time until the count 0 is longer than the polling cycle of JET (polling cycle of JET>polling cycle of NFC).

When the count of the timer 218 reaches 0 and the time is out, the NFC polling signal or the JET polling signal held in the D flip-flop circuit 212, 214 is output. By observing the NFC polling signal (NFC Valid) and the JET polling signal (JET Valid) output from the D flip-flop circuits 212, 214 in this manner, the compatible scheme of the initiator device 10 is detected.

(2-1-2: Two-Scheme Initiator+One-Scheme Target)

Here, the system configuration example for a case where the target device is compatible only with NFC and for a case where the target device is compatible only with JET will be briefly described.

(NFC-Compatible Target)

Figure 5:
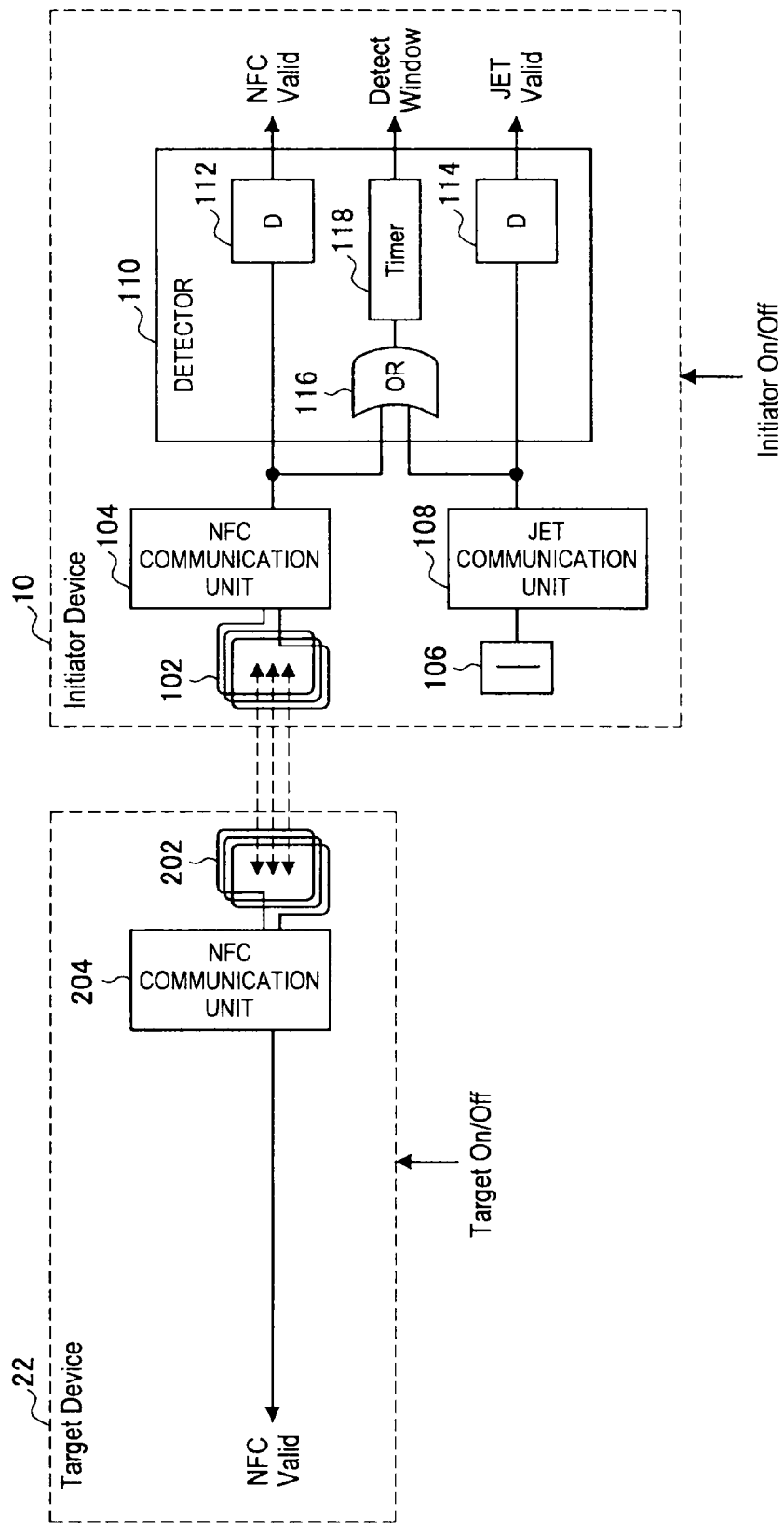
FIG. 5 is an explanatory diagram showing an example of a system configuration including an initiator device that is compatible with a plurality of proximity communication schemes and a target device that is compatible with one proximity communication scheme, and an example of the device configuration of each device.

Next, reference will be made to FIG. 5. An example of a system configuration that includes the initiator device 10 which is compatible with both NFC and JET and a target device 22 which is an NFC-compatible device is shown in FIG. 5.

Additionally, the configuration of the initiator device 10 is as already described. However, in the example of FIG. 5, the target device 22 is a device that is compatible only with NFC, and thus the JET response signal is not obtained at the initiator device 10, and the timer 118 is timed out. Also, the target device 22 is a device that is compatible only with NFC, and unlike the target device 20 described above, it is not provided with the mechanism for deciding the compatible scheme of the counterpart device. Thus, the target device 22 is mainly configured from the antenna 202 for NFC, and the NFC communication unit 204.

(JET-Compatible Target)

Figure 6:
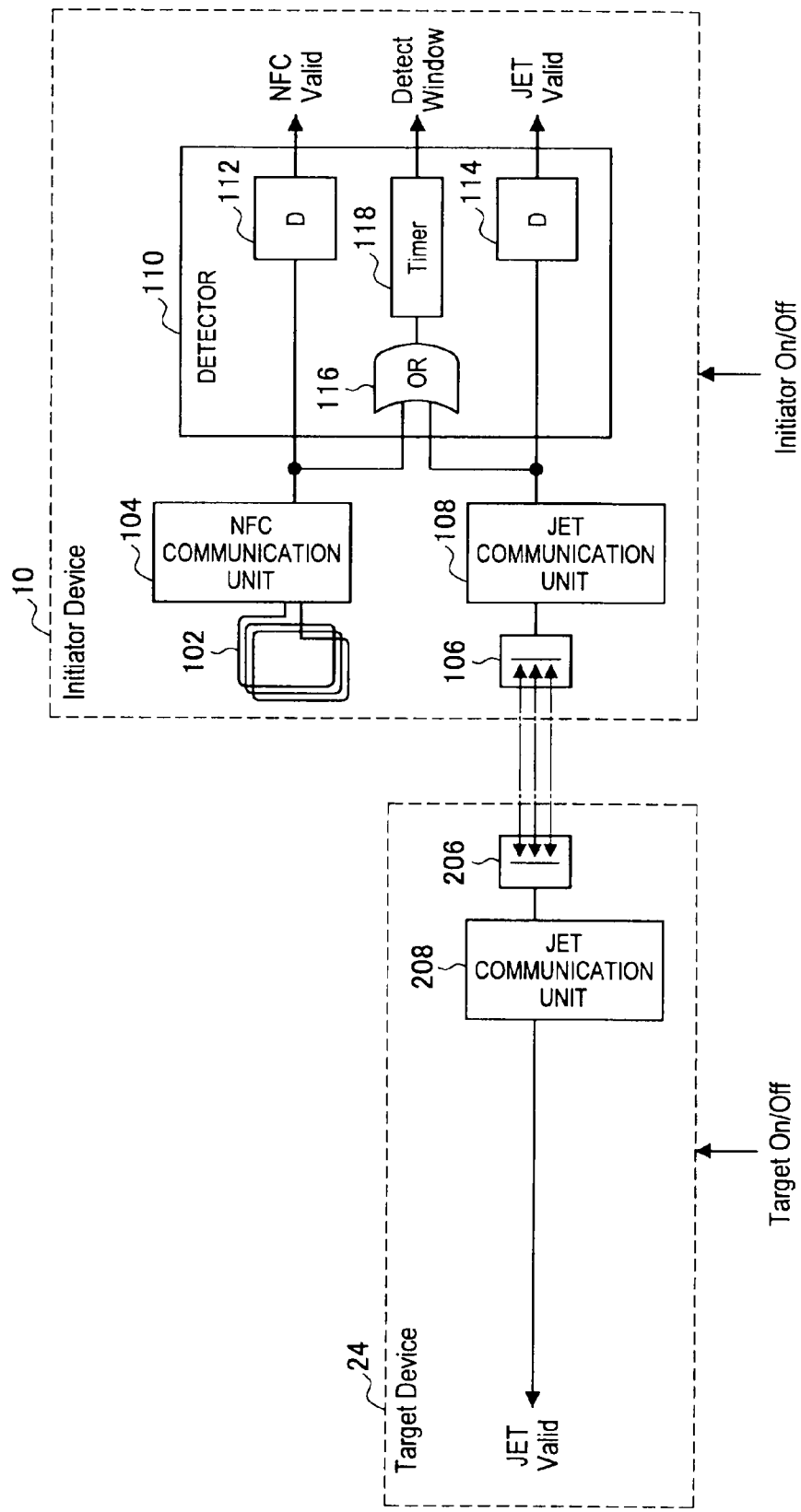
FIG. 6 is an explanatory diagram showing an example of a system configuration including an initiator device that is compatible with a plurality of proximity communication schemes and a target device that is compatible with one proximity communication scheme, and an example of the device configuration of each device.

Next, reference will be made to FIG. 6. An example of a system configuration that includes the initiator device 10 which is compatible with both NFC and JET and a target device 24 which is a JET-compatible device is shown in FIG. 6.

Additionally, the configuration of the initiator device 10 is as already described. However, in the example of FIG. 6, the target device 24 is a device that is compatible only with JET, and thus the NFC response signal is not obtained at the initiator device 10, and the timer 118 is timed out. Also, the target device 24 is a device that is compatible only with JET, and unlike the target device 20 described above, it is not provided with the mechanism for deciding the compatible scheme of the counterpart device. Thus, the target device 24 is mainly configured from the antenna 206 for JET, and the JET communication unit 208. Additionally, it should be noted that, according to the present embodiment, the parallel polling scheme is adopted, and thus communication is possible even with the target device 24 which is not compatible with NFC.

(2-1-3: One-Scheme Initiator+Two-Scheme Target)

Here, an example of a system configuration for a case where the initiator device is compatible only with NFC and for a case where the initiator device is compatible only with JET will be briefly described.

(NFC-Compatible Initiator)

Figure 7:
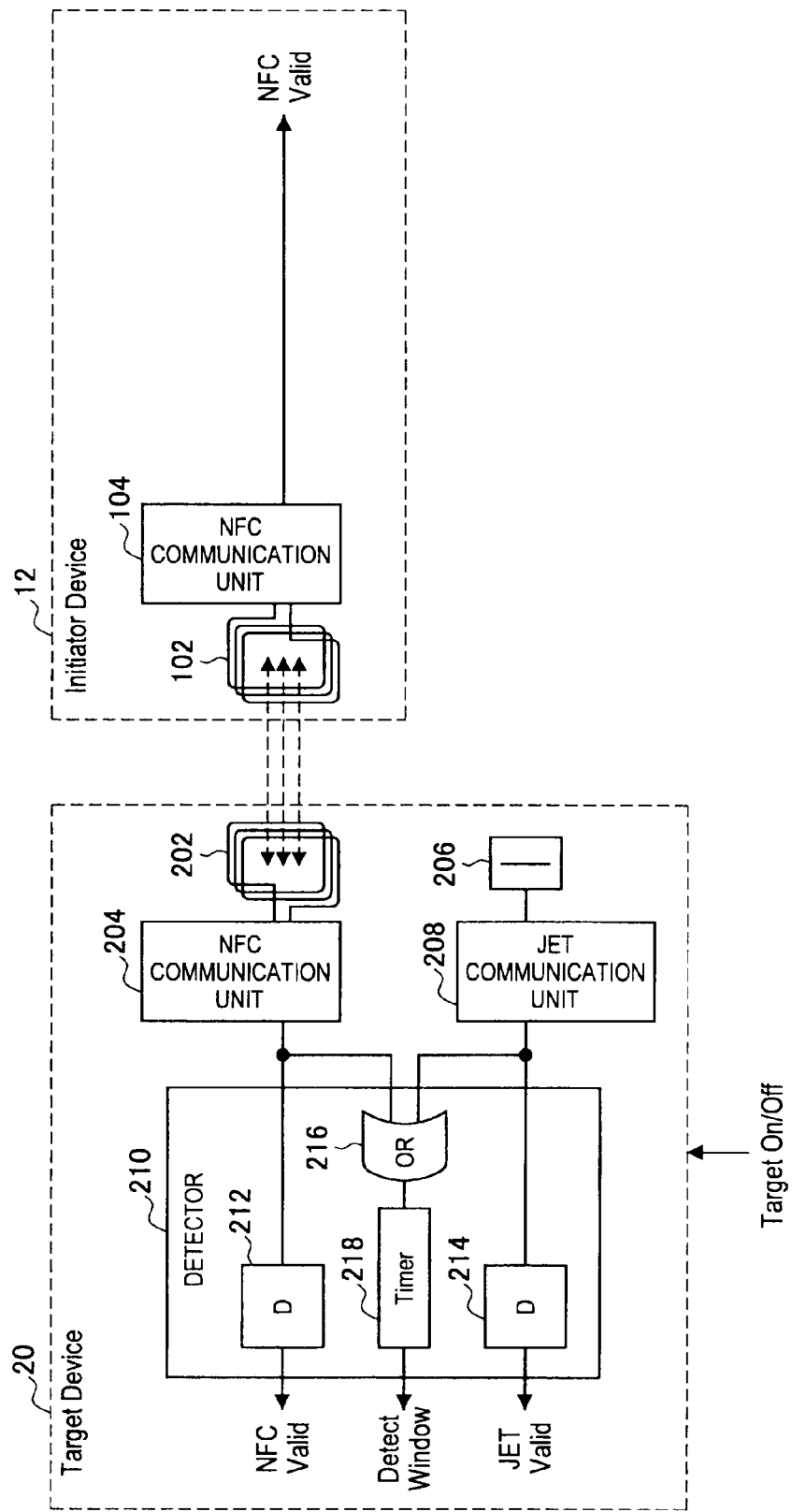
FIG. 7 is an explanatory diagram showing an example of a system configuration including an initiator device that is compatible with one proximity communication scheme and a target device that is compatible with a plurality of proximity communication schemes, and an example of the device configuration of each device.

Next, reference will be made to FIG. 7. An example of a system configuration that includes an initiator device 12 which is an NFC-compatible device and the target device 20 which is compatible with both NFC and JET is shown in FIG. 7.

Additionally, the configuration of the target device 20 is as already described. However, in the example of FIG. 7, the initiator device 12 is a device that is compatible only with NFC, and thus the JET polling signal is not obtained at the target device 20, and the timer 218 is timed out. Also, the initiator device 12 is a device that is compatible only with NFC, and unlike the initiator device 10 described above, it is not provided with the mechanism for deciding the compatible scheme of the counterpart device. Thus, the initiator device 12 is mainly configured from the antenna 102 for NFC, and the NFC communication unit 104.

(JET-Compatible Initiator)

Figure 8:
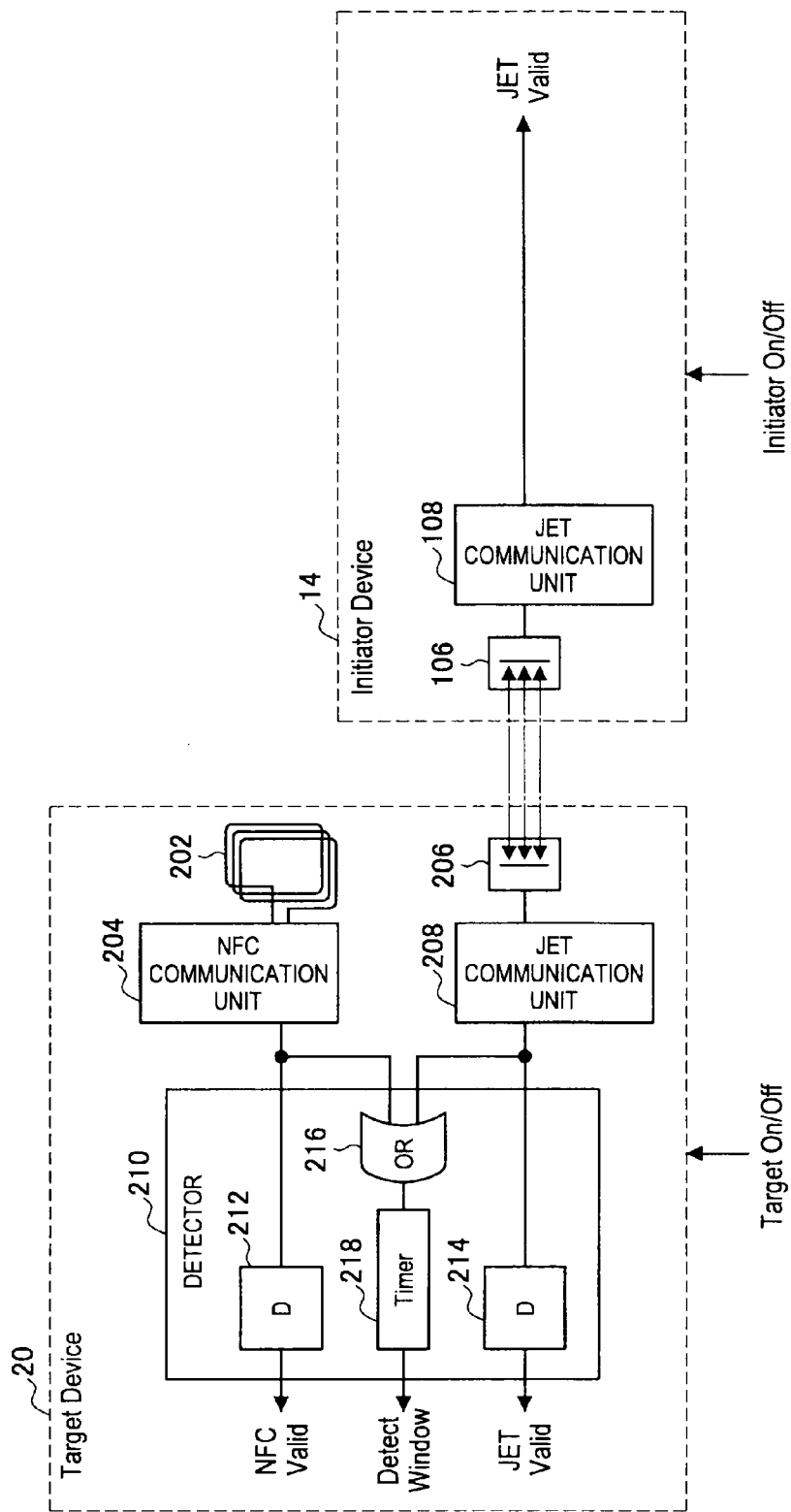
FIG. 8 is an explanatory diagram showing an example of a system configuration including an initiator device that is compatible with one proximity communication scheme and a target device that is compatible with a plurality of proximity communication schemes, and an example of the device configuration of each device.

Next, reference will be made to FIG. 8. An example of a system configuration that includes an initiator device 14 which is a JET-compatible device and the target device 20 which is compatible with both NFC and JET is shown in FIG. 8.

Additionally, the configuration of the target device 20 is as already described. However, in the example of FIG. 8, the initiator device 14 is a device that is compatible only with JET, and thus the NFC polling signal is not obtained at the target device 20, and the timer 218 is timed out. Also, the initiator device 14 is a device that is compatible only with JET, and unlike the initiator device 10 described above, it is not provided with the mechanism for deciding the compatible scheme of the counterpart device. Thus, the initiator device 14 is mainly configured from the antenna 106 for JET, and the JET communication unit 108. Additionally, it should be noted that, according to the present embodiment, the parallel polling scheme is adopted, and thus communication is possible even with the initiator device 14 which is not compatible with NFC.

Heretofore, the configuration examples of a system including a device that is compatible with both NFC and JET have been introduced. As described, according to the present embodiment, a signal corresponding to one scheme is received, and then the reception of a signal corresponding to the other scheme is waited until a time longer than the longer of the polling cycles has elapsed, and the compatible scheme of the counterpart device is determined according to the reception results of both signals. By using such determination method, it becomes possible to accurately determine the compatible scheme of the counterpart device in any of the system configuration examples described above. In the following, the configuration of each device, and the determination method of a compatible scheme according to the present embodiment will be described in greater detail.

<2-2: Configuration of Initiator Device>

First, the detailed configuration of the initiator device 10 according to the present embodiment will be described with reference to FIG. 9. FIG. 9 is an explanatory diagram showing an example of the detailed configuration of the initiator device 10 according to the present embodiment.

Figure 9:
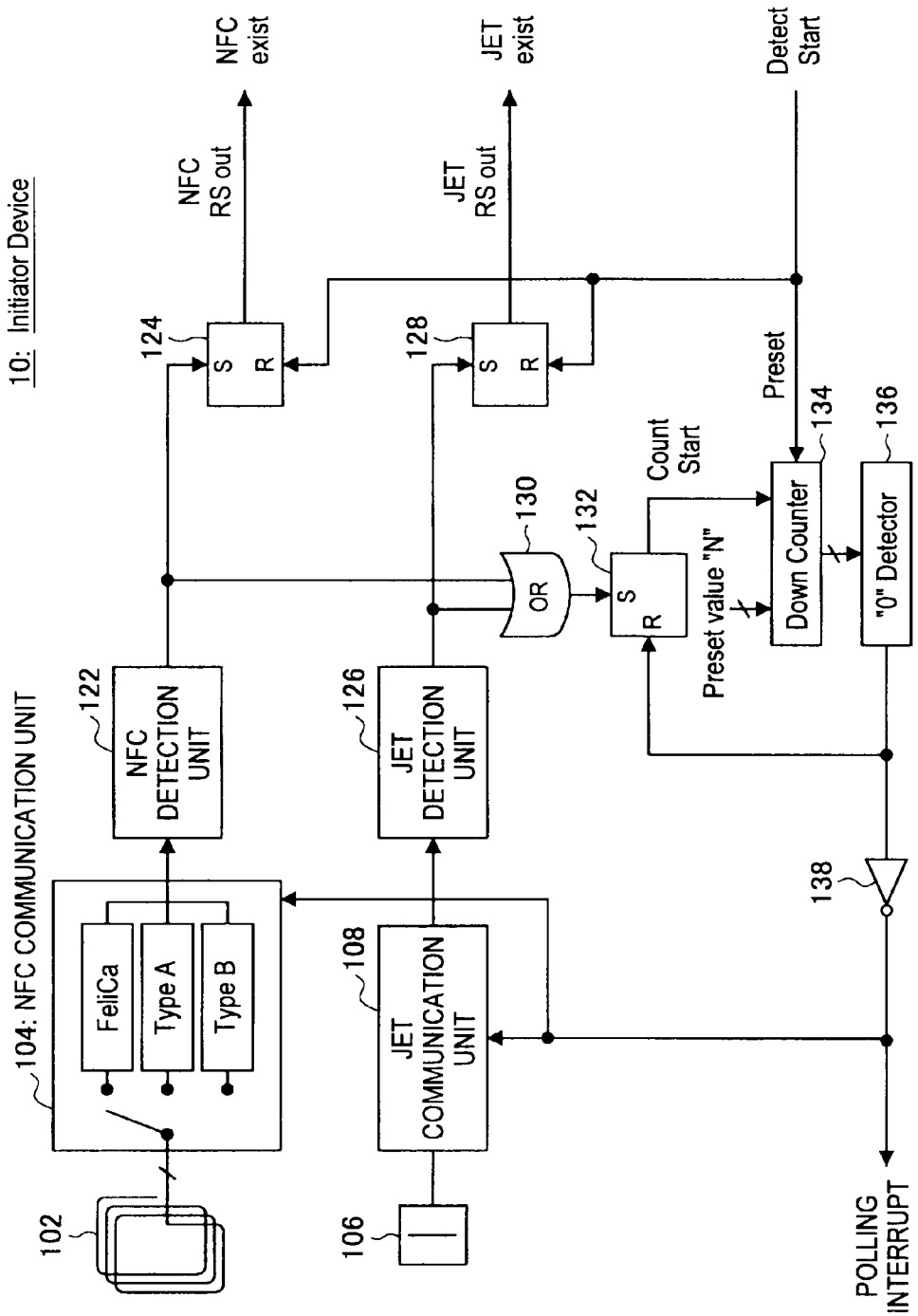
FIG. 9 is an explanatory diagram showing an example of a detailed device configuration of an initiator device according to an embodiment of the present invention.

As shown in FIG. 9, the initiator device 10 mainly includes the antenna 102 for NFC, the NFC communication unit 104, the antenna 106 for JET, the JET communication unit 108, and an NFC detection unit 122. Furthermore, the initiator device 10 includes RS flip-flop circuits 124, 128 and 132, a JET detection unit 126, an OR circuit 130, a down counter 134, a zero detector 136, and an inverting circuit 138. Additionally, when a response to polling is received, a specific value (Preset value "N") is set in the down counter 134. This specific value is set such that the count time is longer than the polling cycle of JET. Also, the RS flip-flop circuits 124 and 128 are reset.

When polling is started, first, an NFC polling signal is transmitted by the NFC communication unit 104 via the antenna 102 for NFC. Additionally, the NFC polling signal that is transmitted here includes a command that allows to detect which type the compatible scheme of the counterpart device is among Type-A, Type-B and FeliCa (registered trademark of Sony Corporation) scheme that are defined for NFC. Also, a JET polling signal is transmitted by the JET communication unit 108 via the antenna 106 for JET.

When an NFC response signal is transmitted from the counterpart device in response to the NFC polling signal transmitted by the NFC communication unit 104, the NFC response signal is received via the antenna 102 for NFC and is input to the NFC communication unit 104. The NFC communication unit 104 decides which type the NFC response signal is among Type-A, Type-B and FeliCa (registered trademark of Sony Corporation) scheme, and inputs the NFC response signal to the NFC detection unit 122 together with the decision result. When the NFC response signal is input, the NFC detection unit 122 outputs a signal of H level that indicates the detection of the NFC response signal, and inputs the same to an S (Set) input of the RS flip-flop circuit 124 and the OR circuit 130.

Furthermore, when a JET response signal is transmitted from the counterpart device in response to the JET polling signal transmitted by the JET communication unit 108, the JET response signal is received via the antenna 106 for JET and is input to the JET detection unit 126 via the JET communication unit 108. Then, the JET response signal input to the JET detection unit 126 is input to an S (Set) input of the RS flip-flop circuit 128 and the OR circuit 130. As has been described, the polling cycle of NFC and the polling cycle of JET are different from each other. Accordingly, a signal of H level indicating that either of the NFC response signal and the JET response signal is received is first input to the OR circuit 130.

When the signal indicating the receipt of the NFC response signal or the JET response signal is input to the OR circuit 130, a signal of H level is output from the OR circuit 130 and is input to an S (Set) input of the RS flip-flop circuit 132. An output signal of the zero detector 136 is to be input to an R (Reset) input of the RS flip-flop circuit 132, but nothing is yet input at this time point. Thus, the signal of H level is output from the RS flip-flop circuit 132, and is input to the down counter 134. When the signal of H level is input from the RS flip-flop circuit 132, the down counter 134 starts countdown.

In this manner, when the NFC response signal or the JET response signal is received, countdown by the down counter 134 is started. As described above, a specific value for counting a time longer than the polling cycle of JET is set in the down counter 134. Thus, the compatible scheme of the counterpart device can be determined by detecting the timing at which the down counter 134 reaches count 0 and by checking at the time point whether the NFC response signal and the JET response signal have been received. The timing at which the down counter 134 reaches count 0 is detected by the zero detector 136.

The zero detector 136 outputs a signal of H level at the timing the count of the down counter 134 reaches 0. The signal of H level output from the zero detector 136 is input to the R (Reset) input of the RS flip-flop circuit 132 and the inverting circuit 138. Accordingly, the RS flip-flop circuit 132 is reset at a timing the count reaches 0. Also, a signal inverted by the inverting circuit 138 is output as a polling interrupt signal, and also, is input to the NFC communication unit 104 and the JET communication unit 108. The compatible scheme of the counterpart device can be determined by checking the signals that are output from the RS flip-flop circuits 124 and 128 (NFC RS out, JET RS out) at this time point.

Heretofore, the configuration of the initiator device 10 has been described. Next, a series of processes by the initiator device 10 will be described.

<2-3: Proximity Communication Scheme Determination Method>

Here, a determination method of a proximity communication scheme according to the present embodiment will be described with reference to FIG. 10. Here, the flow regarding the determination process of the compatible scheme of a counterpart device by the initiator device 10 described above will be concretely described with reference to FIG. 10.

Figure 10:
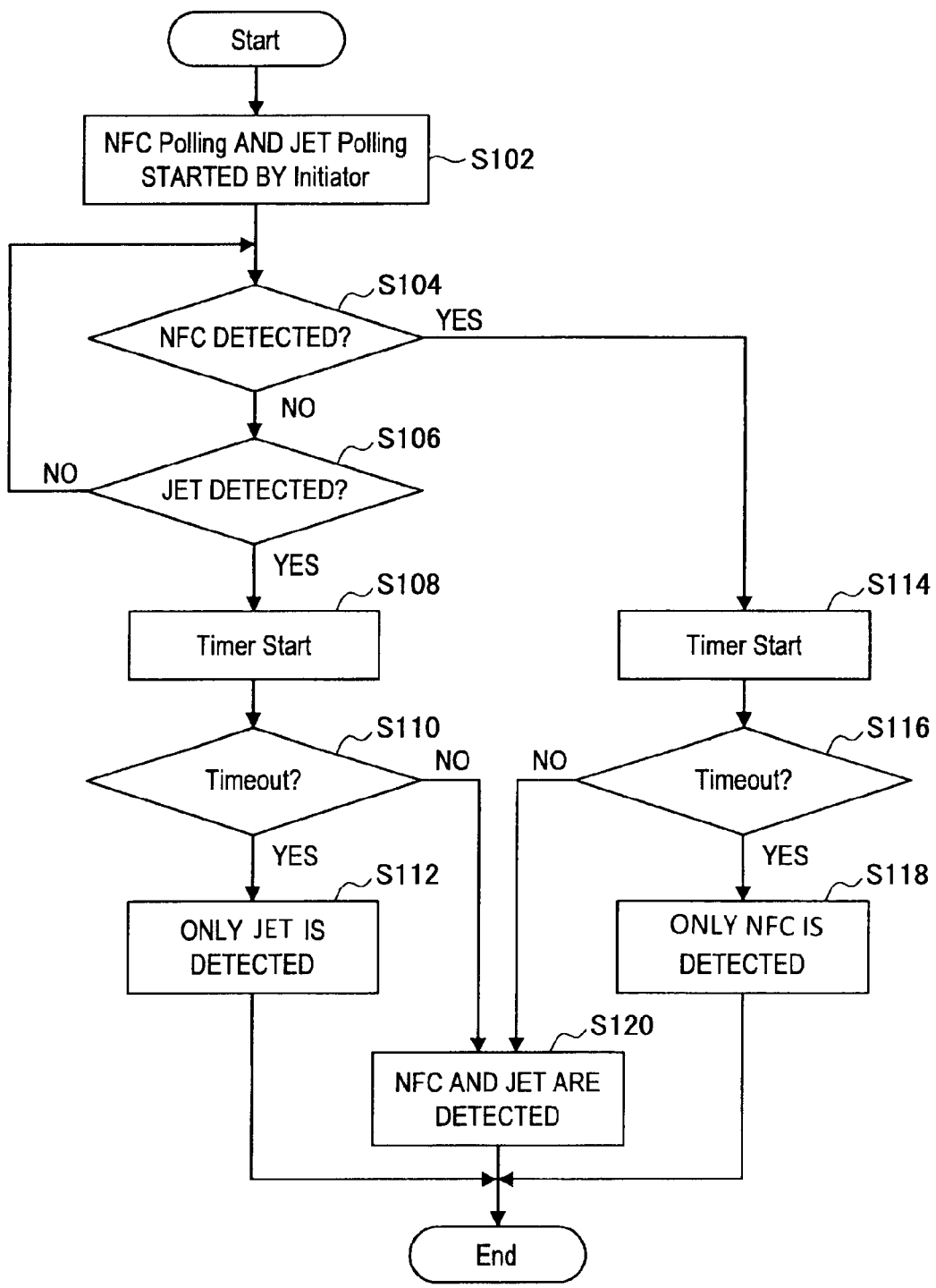
FIG. 10 is an explanatory diagram showing a flow of a proximity communication scheme determination process performed at the initiator device according to the embodiment.

As shown in FIG. 10, first, an NFC polling signal and a JET polling signal are transmitted by the initiator device 10, and the NFC polling and the JET polling are started (S102). Next, whether an NFC response signal is detected or not is decided by the initiator device 10 (S104). In case an NFC response signal is detected, the initiator device 10 proceeds to the process of step S114. On the other hand, when the NFC response signal is not detected, the initiator device 10 proceeds to the process of step S106.

In case the initiator device 10 proceeded to the process of step S106, the initiator device 10 decides whether a JET response signal is detected or not (S106). In case a JET response signal is detected, the initiator device 10 proceeds to the process of step S108. On the other hand, in case a JET response signal is not detected, the initiator device 10 returns again to the process of step S104. In case the initiator device 10 proceeded to the process of step S108, the initiator device 10 starts a timer (the down counter 134) (S108). Then, the initiator device 10 decides whether or not an NFC response signal is detected before the timeout of the timer (S110).

In case timeout is reached without an NFC response signal being detected in step S110, the initiator device 10 proceeds to the process of step S112. On the other hand, in case an NFC response signal is detected before the timeout, the initiator device 10 proceeds to the process of step S120. In case the initiator device 10 proceeded to the process of step S112, the initiator device 10 determines that the compatible scheme of the counterpart device is JET only (S112), and ends the series of processes. On the other hand, in case the initiator device 10 proceeded to the process of step S120, the initiator device 10 determines that the counterpart device is compatible with both NFC and JET (S120), and ends the series of processes.

Now, in case an NFC response signal was detected in the process of step S104 and the initiator device 10 proceeded to the process of step S114, the initiator device 10 starts a timer (the down counter 134) (S114). Then, the initiator device 10 decides whether or not a JET response signal is detected before the timeout of the timer (S116). In case timeout is reached without a JET response signal being detected in step S116, the initiator device 10 proceeds to the process of step S118.

On the other hand, in case a JET response signal is detected before the timeout in step S116, the initiator device 10 proceeds to the process of step 5120. In case the initiator device 10 proceeded to the process of step S118, the initiator device 10 determines that the compatible scheme of the counterpart device is NFC only, (S118), and ends the series of processes. On the other hand, in case the initiator device 10 proceeded to the process of S120, the initiator device 10 determines that the counterpart device is compatible with both NFC and JET (S120), and ends the series of processes.

Heretofore, the determination method of a proximity communication scheme according to the present embodiment has been described. Next, the change over time in signals observed at the initiator device 10 shown in FIG. 9 at the time of performance of the series of processes according to the flow shown in FIG. 10 will be described.

<2-4: Time Chart>

In the following, an explanation will be given on the change over time in signals (NFC/JET RS out (NFC/JET exist)) that are output from the RS flip-flop circuits 124 and 128 at the time of the initiator device 10 shown in FIG. 9 performing the process of FIG. 10, and on the change in the status of the down counter 134.

(2-4-1: (Case 1) NFC Detected+JET Detected)

First, reference will be made to FIG. 11. Here, an explanation will be given on a case (case 1) where the target device 20 is compatible with both NFC and JET, as in the system configuration example shown in FIG. 4. According to this case, the NFC response signal and the JET response signal are detected at the initiator device 10 before timeout.

When a process of detecting the compatible scheme of a counterpart device is started, a signal (Detect Start) indicating the start appears, and the RS flip-flop circuits 124 and 128 are reset, and also the down counter 134 is preset (Preset). Thus, the status of the down counter 134 (Timer Status) is set to a specific value N. However, the countdown by the down counter 134 is not started, and thus the signal indicating the operation of the timer (Timer on) is still at L level.

Furthermore, the NFC polling and the JET polling are started with the start of the process, and thus a signal indicating the transmission timing of an NFC polling signal (NFC Polling) and a signal indicating the transmission timing of a JET polling signal (JET Polling) also appear. Here, the dotted arrow shows the transmission timing of the NFC polling signal or the JET polling signal, and the solid arrow shows the reception timing of the NFC response signal or the JET response signal.

Figure 11:
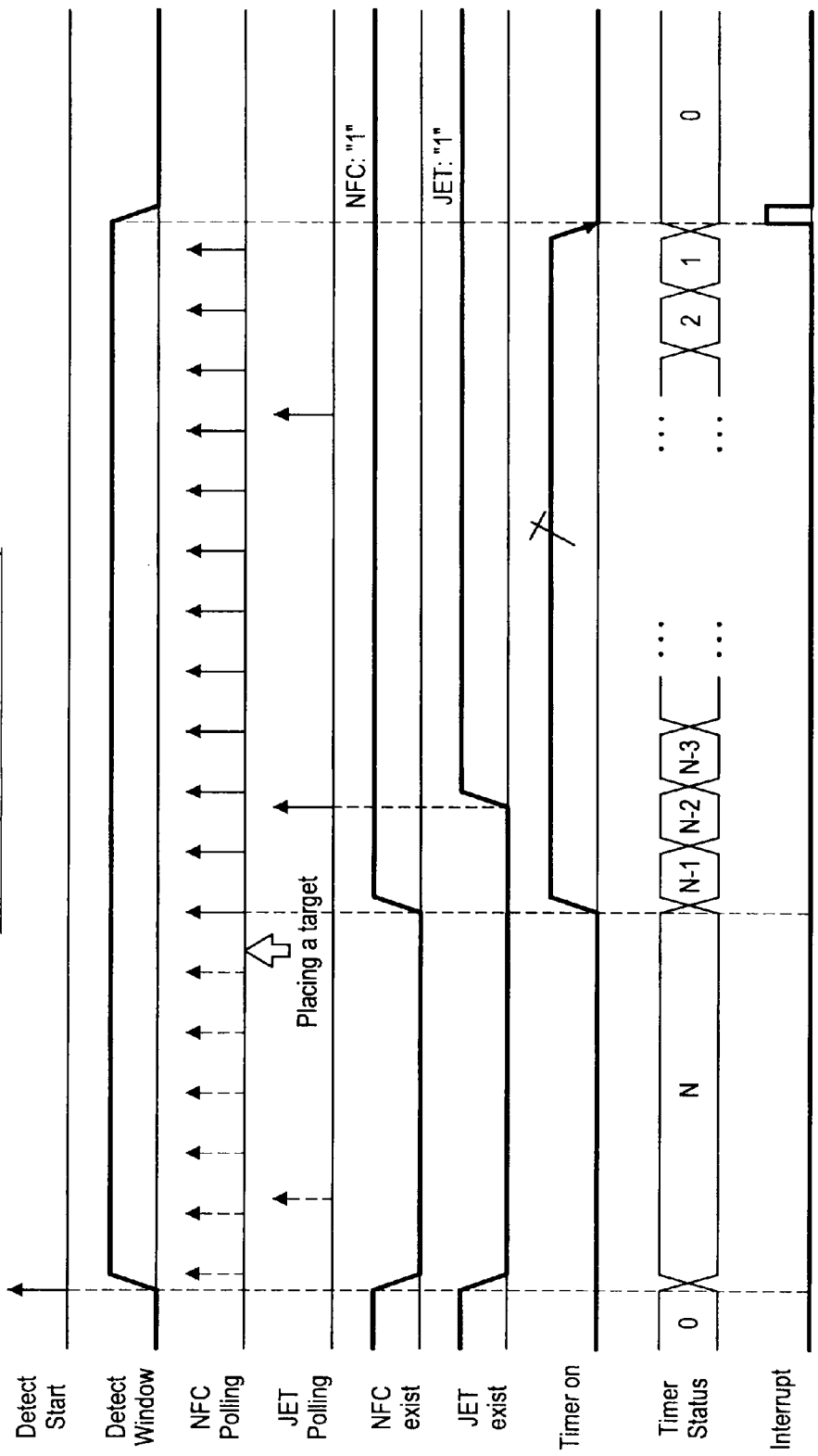
FIG. 11 is an explanatory diagram showing change over time in signals that are output at the time of operation of the initiator device according to the embodiment, and the change in the status of a timer that is used for determination of a proximity communication scheme.

In the example of FIG. 11, the NFC polling signal is transmitted and the NFC response signal is received immediately after the time point of the target device 20 being placed over the counterpart device (Placing a Target). Thus, in the example of FIG. 11, the countdown by the down counter 134 is started at the reception timing of the NFC response signal, and the signal indicating the operation of the timer (Timer on) becomes H level. Also, a signal of H level indicating the detection of the NFC response signal is input at this time point from the NFC detection unit 122 to the S input of the RS flip-flop circuit 124, and thus the output of the RS flip-flop circuit 124 (NFC exist) rises at this timing.

Furthermore, in the example of FIG. 11, since the target device 20 that is compatible with both NFC and JET is assumed as the counterpart device, a JET response signal for the JET polling signal that is transmitted after the NFC polling signal is received. When the JET response signal is received, a signal of H level indicating the detection of the JET response signal is input at this timing from the JET detection unit 126 to the S input of the RS flip-flop circuit 128, and the output of the RS flip-flop circuit 128 (JET exist) rises. The countdown by the down counter 134 continues during this time, and the countdown stops in response to the signal of H level that is output from the zero detector 136 at the timing the count reaches 0.

When a signal notifying the end of the countdown is input from the zero detector 136 to the NFC communication unit 104 and the JET communication unit 108, the NFC communication unit 104 and the JET communication unit 108 respectively stop the transmission of the NFC polling signal or the JET polling signal. Accordingly, the signal indicating the transmission timing of the NFC polling signal (NFC Polling) and the signal indicating the transmission timing of the JET polling signal (JET Polling) cease to appear. Furthermore, a polling interrupt signal (Interrupt) is output at the timing of the end of the countdown. At this time, since both outputs of the RS flip-flop circuits 124 and 128 are at H level, the counterpart device is determined to be a device that is compatible with both NFC and JET.

(2-4-2: (Case 2) NFC Detected+JET Non-Detected)

Next, reference will be made to FIG. 12. Here, an explanation will be given on a case (case 2) where the target device 22 is compatible with NFC only, as in the system configuration example shown in FIG. 5. According to this case, only the NFC response signal is detected at the initiator device 10 before timeout.

When a process of detecting the compatible scheme of a counterpart device is started, a signal (Detect Start) indicating the start appears, and the RS flip-flop circuits 124 and 128 are reset, and also the down counter 134 is preset (Preset). Thus, the status of the down counter 134 (Timer Status) is set to a specific value N. However, the countdown by the down counter 134 is not started, and thus the signal indicating the operation of the timer (Timer on) is still at L level.

Furthermore, the NFC polling and the JET polling are started with the start of the process, and thus a signal indicating the transmission timing of an NFC polling signal (NFC Polling) and a signal indicating the transmission timing of a JET polling signal (JET Polling) also appear. Here, the dotted arrow shows the transmission timing of the NFC polling signal or the JET polling signal, and the solid arrow shows the reception timing of the NFC response signal.

Figure 12:
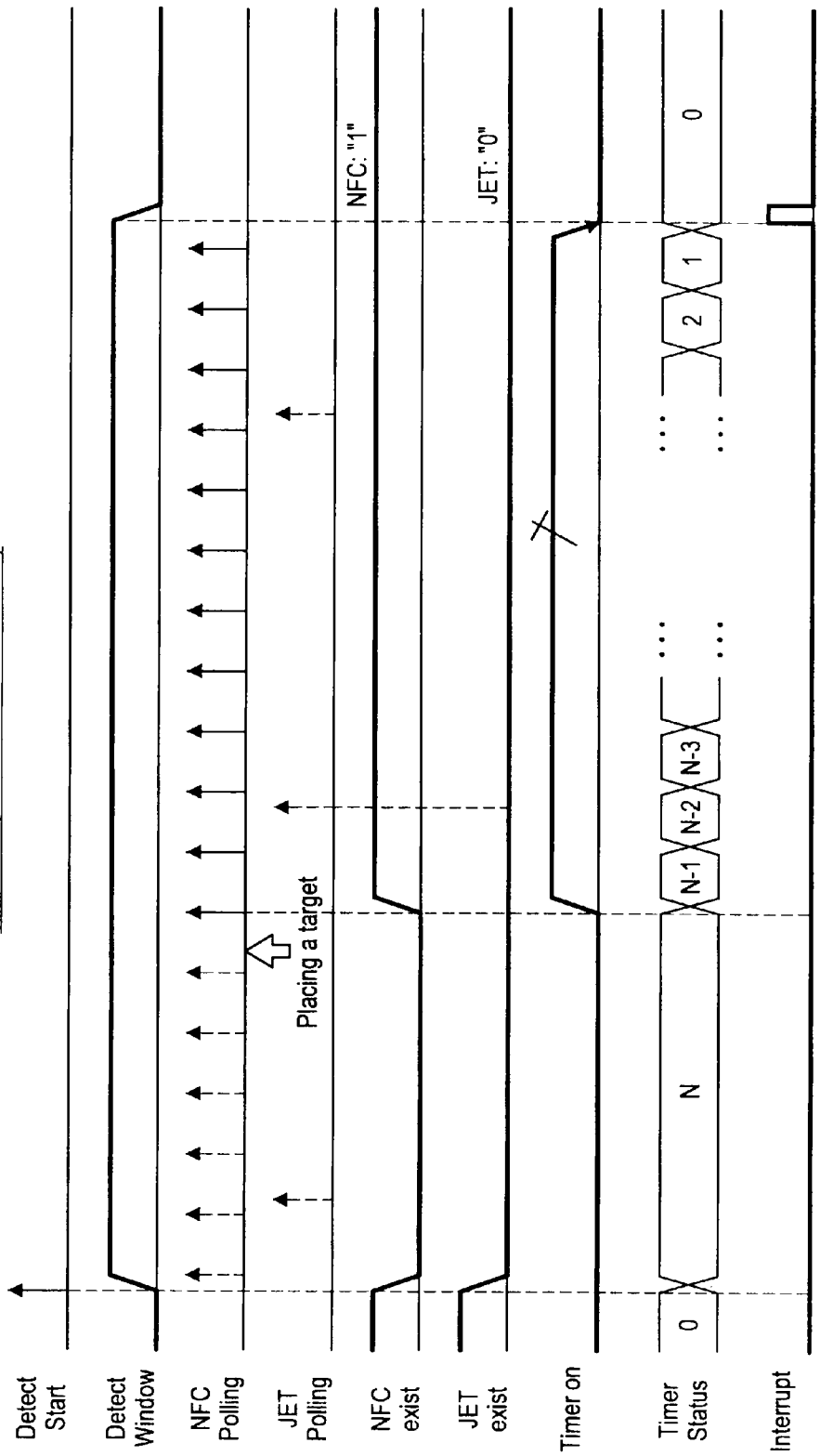
FIG. 12 is an explanatory diagram showing change over time in signals that are output at the time of operation of the initiator device according to the embodiment, and the change in the status of a timer that is used for determination of a proximity communication scheme.

In the example of FIG. 12, the NFC polling signal is transmitted and the NFC response signal is received immediately after the time point of the target device 22 being placed over the counterpart device (Placing a Target). Thus, in the example of FIG. 12, the countdown by the down counter 134 is started at the reception timing of the NFC response signal. Accordingly, the signal indicating the operation of the timer (Timer on) becomes H level. Also, a signal of H level indicating the detection of the NFC response signal is input at this time point from the NFC detection unit 122 to the S input of the RS flip-flop circuit 124, and thus the output of the RS flip-flop circuit 124 (NFC exist) rises at this timing.

Furthermore, in the example of FIG. 12, since the target device 22 that is compatible with NFC only is assumed as the counterpart device, a JET response signal is not transmitted in response to the JET polling signal that is transmitted after the NFC polling signal. Accordingly, a signal of H level indicating the detection of a JET response signal is not input from the JET detection unit 126 to the S input of the RS flip-flop circuit 128, and the output of the RS flip-flop circuit 128 (JET exist) remains at L level. The countdown by the down counter 134 continues during this time, and the countdown stops in response to the signal of H level that is output from the zero detector 136 at the timing the count reaches 0.

When a signal notifying the end of the countdown is input from the zero detector 136 to the NFC communication unit 104 and the JET communication unit 108, the NFC communication unit 104 and the JET communication unit 108 respectively stop the transmission of the NFC polling signal or the JET polling signal. Accordingly, the signal indicating the transmission timing of the NFC polling signal (NFC Polling) and the signal indicating the transmission timing of the JET polling signal (JET Polling) cease to appear. Furthermore, a polling interrupt signal (Interrupt) is output at the timing of the end of the countdown. At this time, since the output of the RS flip-flop circuit 124 is at H level and the output of the RS flip-flop circuit 128 is at L level, the counterpart device is determined to be a device that is compatible with NFC only.

(2-4-3: (Case 3) NFC Non-Detected+JET Detected)

Next, reference will be made to FIG. 13. Here, an explanation will be given on a case (case 3) where the target device 24 is compatible with JET only, as in the system configuration example shown in FIG. 6. According to this case, only the JET response signal is detected at the initiator device 10 before timeout.

When a process of detecting the compatible scheme of a counterpart device is started, a signal (Detect Start) indicating the start appears, and the RS flip-flop circuits 124 and 128 are reset, and also the down counter 134 is preset (Preset). Thus, the status of the down counter 134 (Timer Status) is set to a specific value N. However, the countdown by the down counter 134 is not started, and thus the signal indicating the operation of the timer (Timer on) is still at L level.

Furthermore, the NFC polling and the JET polling are started with the start of the process, and thus a signal indicating the transmission timing of an NFC polling signal (NFC Polling) and a signal indicating the transmission timing of a JET polling signal (JET Polling) also appear. Here, the dotted arrow shows the transmission timing of the NFC polling signal or the JET polling signal, and the solid arrow shows the reception timing of the JET response signal.

Figure 13:
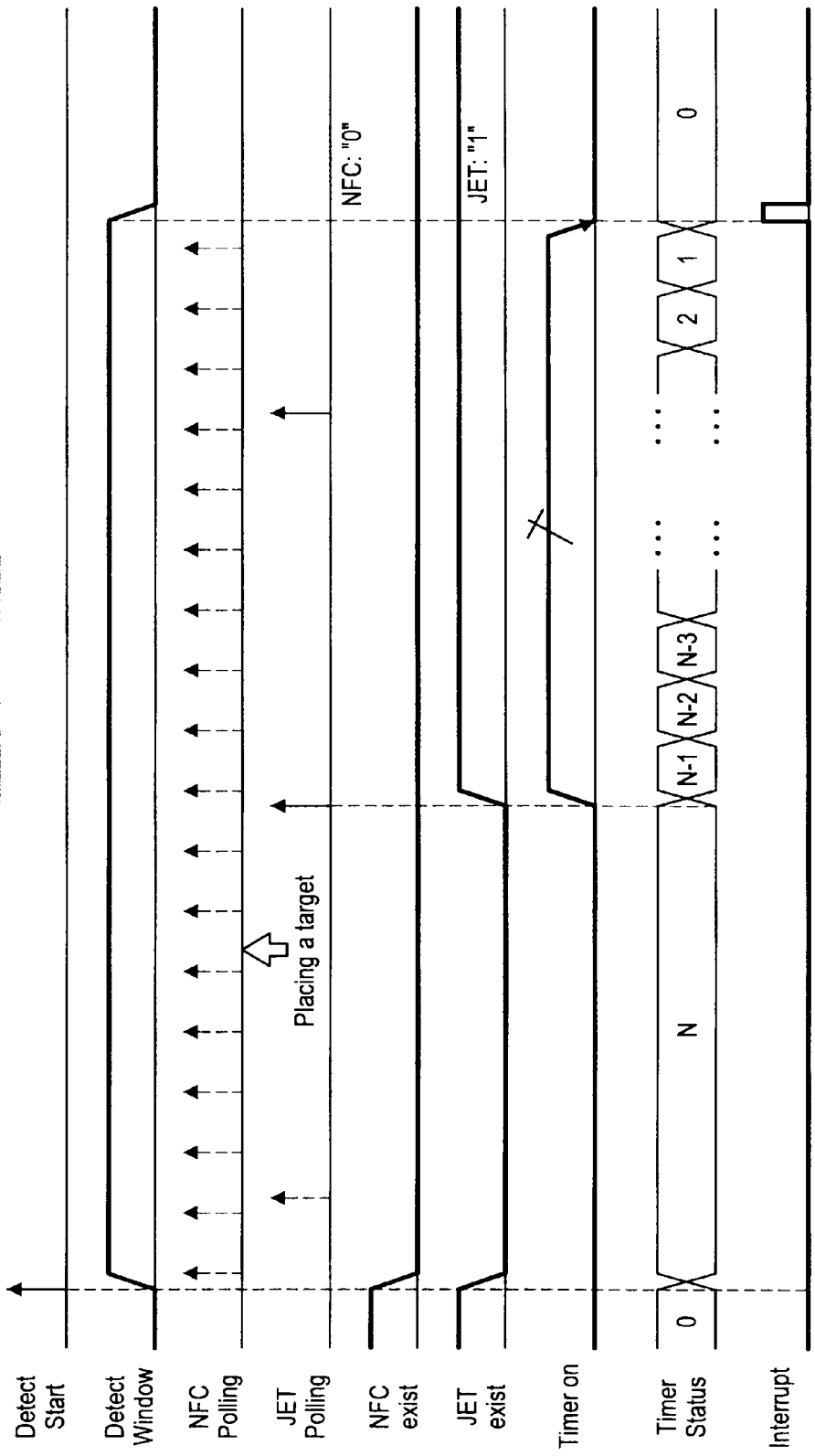
FIG. 13 is an explanatory diagram showing change over time in signals that are output at the time of operation of the initiator device according to the embodiment, and the change in the status of a timer that is used for determination of a proximity communication scheme.

In the example of FIG. 13, the NFC polling signal is transmitted immediately after the time point of the target device 24 being placed over the counterpart device (Placing a Target), but an NFC response signal is not received. On the other hand, a JET response signal transmitted in response to the JET polling signal that is transmitted after the NFC polling signal is received. In this case, the countdown by the down counter 134 is started at the reception timing of the JET response signal. Then, a signal indicating the operation of the timer (Timer on) becomes H level. Also, a signal of H level indicating the detection of the JET response signal is input at this time point from the JET detection unit 126 to the S input of the RS flip-flop circuit 128, and thus the output of the RS flip-flop circuit 128 (JET exist) rises at this timing.

As described above, since the target device 24 that is compatible with JET only is assumed as the counterpart device, an NFC response signal is not transmitted in response to the NFC polling signal. Accordingly, a signal of H level indicating the detection of an NFC response signal is not input from the NFC detection unit 122 to the S input of the RS flip-flop circuit 124, and the output of the RS flip-flop circuit 124 (NFC exist) remains at L level. The countdown by the down counter 134 continues during this time, and the countdown stops in response to the signal of H level that is output from the zero detector 136 at the timing the count reaches 0.

When a signal notifying the end of the countdown is input from the zero detector 136 to the NFC communication unit 104 and the JET communication unit 108, the NFC communication unit 104 and the JET communication unit 108 respectively stop the transmission of the NFC polling signal or the JET polling signal. Accordingly, the signal indicating the transmission timing of the NFC polling signal (NFC Polling) and the signal indicating the transmission timing of the JET polling signal (JET Polling) cease to appear. Furthermore, a polling interrupt signal (Interrupt) is output at the timing of the end of the countdown. At this time, since the output of the RS flip-flop circuit 124 is at L level and the output of the RS flip-flop circuit 128 is at H level, the counterpart device is determined to be a device that is compatible with JET only.

Heretofore, an explanation has been given, in relation to the configuration of the initiator device 10, on the device configuration, the determination method of the scheme of a counterpart device, and the time chart (change over time in output signals, change in status of a timer). By adopting the configuration described above, a communication scheme with which a counterpart device is compatible can be accurately determined.

<2-5: Configuration of Target Device>

Next, the detailed configuration of the target device 20 according to the present embodiment will be described with reference to FIG. 14. FIG. 14 is an explanatory diagram showing an example of the detailed configuration of the target device 20 according to the present embodiment.

Figure 14:
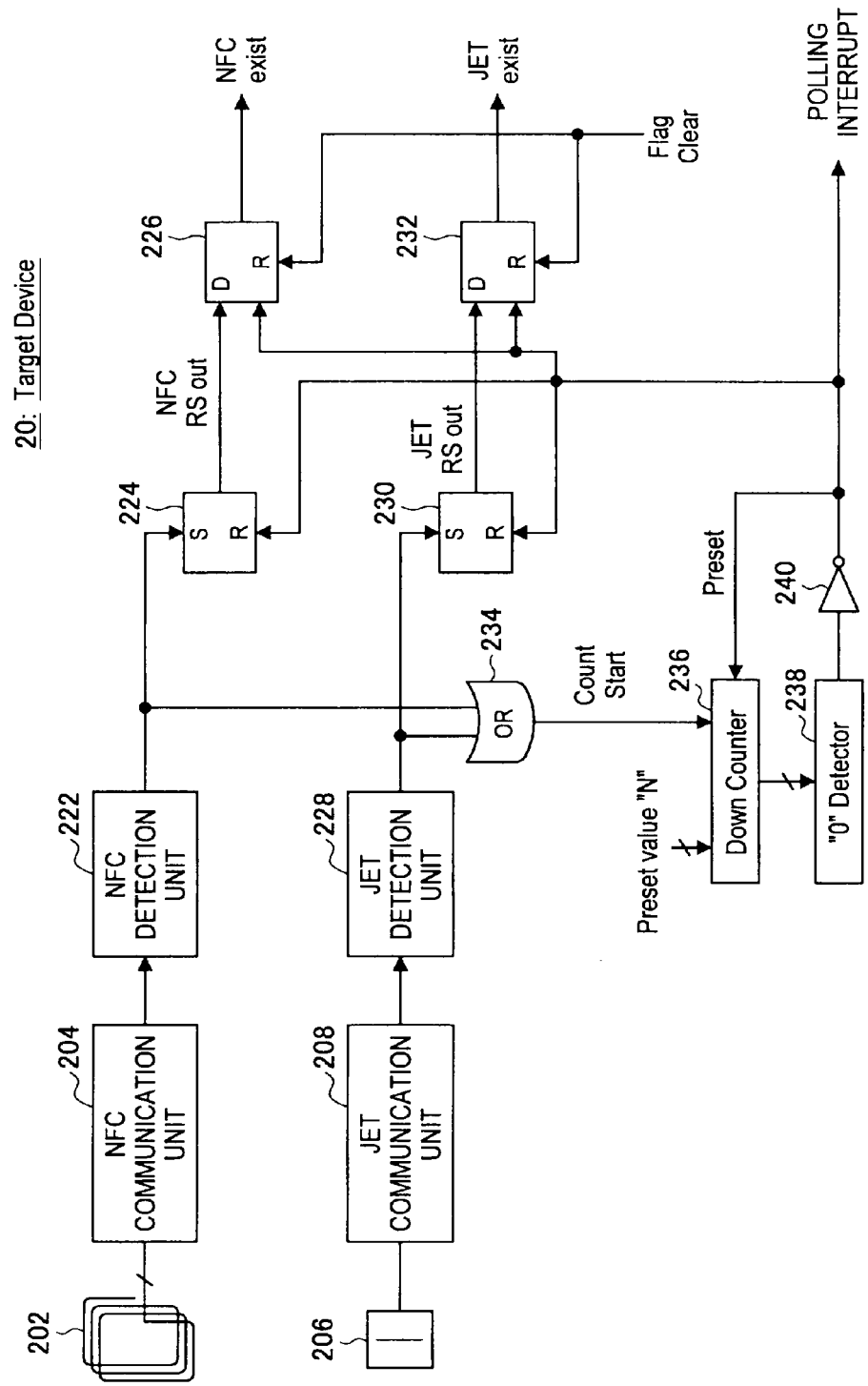
FIG. 14 is an explanatory diagram showing an example of a detailed device configuration of a target device according to the embodiment.

As shown in FIG. 14, the target device 20 mainly includes the antenna 202 for NFC, the NFC communication unit 204, the antenna 206 for JET, the JET communication unit 208, and an NFC detection unit 222. Furthermore, the target device 20 includes RS flip-flop circuits 224 and 230, D flip-flop circuits 226 and 232, a JET detection unit 228, an OR circuit 234, a down counter 236, a zero detector 238, and an inverting circuit 240. Additionally, when polling is started, a specific value (Preset value "N") is set in the down counter 236. This specific value is set such that the count time is longer than the polling cycle of JET.

When polling is started, first, an NFC polling signal is received by the NFC communication unit 204 via the antenna 202 for NFC. When the NFC polling signal is received, the NFC communication unit 204 transmits to a counterpart device an NFC response signal in response to the received NFC polling signal. Also, a JET polling signal is received by the JET communication unit 208 via the antenna 206 for JET. When the JET polling signal is received, the JET communication unit 208 transmits to the counterpart device a JET response signal in response to the received JET polling signal.

The NFC polling signal received via the antenna 202 for NFC is input to the NFC detection unit 222 via the NFC communication unit 204. When the NFC polling signal is input, the NFC detection unit 222 outputs a signal of H level that indicates the detection of the NFC polling signal, and inputs the same to an S (Set) input of the RS flip-flop circuit 224 and the OR circuit 234.

Furthermore, the JET polling signal received via the antenna 206 for JET is input to the JET detection unit 228 via the JET communication unit 208. When the JET polling signal is input, the JET detection unit 228 outputs a signal of H level that indicates the detection of the JET polling signal, and inputs the same to an S (Set) input of the RS flip-flop circuit 230 and the OR circuit 234.

As has been described, the polling cycle of NFC and the polling cycle of JET are different from each other. Accordingly, a signal of H level indicating that either of the NFC response signal and the JET response signal is received is input to the OR circuit 234. When the signal indicating the receipt of the NFC polling signal or the JET polling signal is input to the OR circuit 234, a signal of H level is output from the OR circuit 234 and is input to the down counter 236. The down counter 236 starts countdown upon the input of the signal from the OR circuit 234.

In this manner, when the NFC polling signal or the JET polling signal is received, countdown by the down counter 236 is started. As described above, a specific value for counting a time longer than the polling cycle of JET is set in the down counter 236. Thus, the compatible scheme of the counterpart device can be determined by detecting the timing at which the down counter 236 reaches count 0 and by checking at the time point whether the NFC polling signal and the JET polling signal have been received. The timing at which the down counter 236 reaches count 0 is detected by the zero detector 238.

The zero detector 238 outputs a signal of H level at the timing the count of the down counter 236 reaches 0. The signal of H level output from the zero detector 238 is output as a polling interrupt signal, and also is input, via the inverting circuit 240, to the down counter 236, the R (Reset) inputs of the RS flip-flop circuits 224 and 230, and CLK inputs of the D flip-flop circuits 226 and 232. The down counter 236 sets the counter again to the specific value (Preset value "N") in accordance with the signal input from the zero detector 238 in response to the count 0.

Furthermore, the RS flip-flop circuits 224 and 230 are reset in accordance with the signal input from the zero detector 238 in response to the count 0. Furthermore, the D flip-flop circuits 226 and 232 output values held until then, in accordance with the signal input from the zero detector 238 in response to the count 0. Additionally, the detection result of the NFC polling signal by the NFC detection unit 222 is input to the D flip-flop circuit 226 via the RS flip-flop circuit 224. Also, the detection result of the JET polling signal by the JET detection unit 228 is input to the D flip-flop circuit 232 via the RS flip-flop circuit 230. Thus, the compatible scheme of a counterpart device can be determined by checking signals (NFC exist, JET exist) that are output from the D flip-flop circuits 226 and 232.

Heretofore, the configuration of the target device 20 has been described. Next, a series of processes by the target device 20 will be described.

<2-6: Proximity Communication Scheme Determination Method>

Here, a determination method of a proximity communication scheme according to the present embodiment will be described with reference to FIG. 15. Here, the flow regarding the determination process of the compatible scheme of a counterpart device by the target device 20 described above will be concretely described with reference to FIG. 15.

Figure 15:
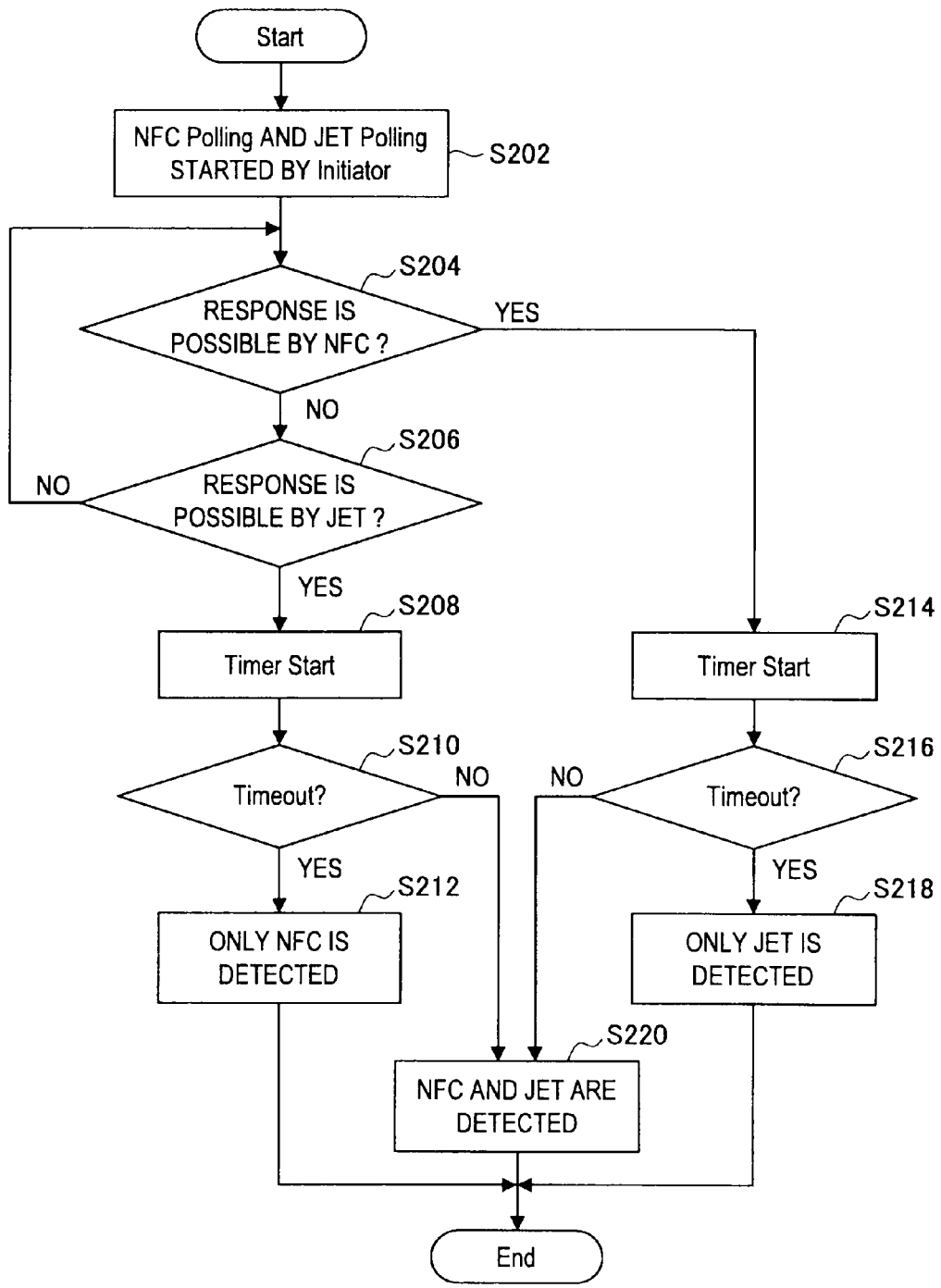
FIG. 15 is an explanatory diagram showing a flow of a proximity communication scheme determination process performed at the target device according to the embodiment.

As shown in FIG. 15, first, an NFC polling signal and a JET polling signal are transmitted by the initiator device 10, and the NFC polling and the JET polling are started (S202). Next, whether an NFC polling signal to which response is possible is detected or not is decided by the target device 20 (S204). In case an NFC polling signal is detected, the target device 20 transmits an NFC response signal and proceeds to the process of step S214. On the other hand, in case an NFC polling signal to which response is possible is not detected, the target device 20 proceeds to the process of step S206.

In case the target device 20 proceeded to the process of step S206, the target device 20 decides whether a JET polling signal to which response is possible is detected or not (S206). In case a JET polling signal is detected, the target device 20 transmits a JET response signal and proceeds to the process of step S208. On the other hand, in case a JET polling signal to which response is possible is not detected, the target device 20 returns again to the process of step S204. In case the target device 20 proceeded to the process of step S208, the target device 20 starts a timer (the down counter 236) (S208). Then, the target device 20 decides whether an NFC polling signal is detected or not before the timeout of the timer (S210).

In case timeout is reached without an NFC polling signal being detected in step S210, the target device 20 proceeds to the process of step S212. On the other hand, in case an NFC polling signal is detected before the timeout, the target device 20 proceeds to the process of step S220. In case the target device 20 proceeded to the process of step S212, the target device 20 determines that the compatible scheme of the counterpart device is NFC only (S212), and ends the series of processes. On the other hand, in case the target device 20 proceeded to the process of step S220, the target device 20 determines that the counterpart device is compatible with both NFC and JET (S220), and ends the series of processes.

Now, in case an NFC polling signal was detected in the process of step S204 and the target device 20 proceeded to the process of step S214, the target device 20 starts a timer (the down counter 236) (S214). Then, the target device 20 decides whether or not a JET polling signal is detected before the timeout of the timer (S216). In case timeout is reached without a JET polling signal being detected in step S216, the target device 20 proceeds to the process of step S218.

On the other hand, in case a JET polling signal is detected before the timeout in step S216, the target device 20 proceeds to the process of step S220. In case the target device 20 proceeded to the process of step S218, the target device 20 determines that the compatible scheme of the counterpart device is JET only (S218), and ends the series of processes. On the other hand, in case the target device 20 proceeded to the process of S220, the target device 20 determines that the counterpart device is compatible with both NFC and JET (S220), and ends the series of processes.

Heretofore, the determination method of a proximity communication scheme according to the present embodiment has been described. Next, the change over time in signals observed at the target device 20 shown in FIG. 14 at the time of performance of the series of processes according to the flow shown in FIG. 15 will be described.

<2-7: Time Chart>

In the following, an explanation will be given on the change over time in signals (NFC/JET exist) output from the D flip-flop circuits 226 and 232 at the time of the target device 20 shown in FIG. 14 performing the process of FIG. 15, and the change in the status of the down counter 236.

(2-7-1: (Case 1) NFC Detected+JET Detected)

First, reference will be made to FIG. 16. Here, an explanation will be given on a case (case 1) where the initiator device 10 is compatible with both NFC and JET, as in the system configuration example shown in FIG. 4. According to this case, the NFC polling signal and the JET polling signal are detected at the target device 20 before timeout.

When a process of detecting the compatible scheme of a counterpart device is started and the first polling signal (the NFC polling signal in the example of FIG. 16) is received, the down counter 236 is preset (Preset). And the status of the down counter 236 (Timer Status) is set to a specific value N. Also, since countdown by the down counter 236 is started at the timing of reception of the first polling signal, a signal indicating the operation of the timer (Timer on) remains at L level until the reception timing.

When the NFC polling and the JET polling are started by the initiator device 10, a signal indicating the reception timing of an NFC polling signal (NFC Polling) and a signal indicating the reception timing of a JET polling signal (JET Polling) appear.

Figure 16:
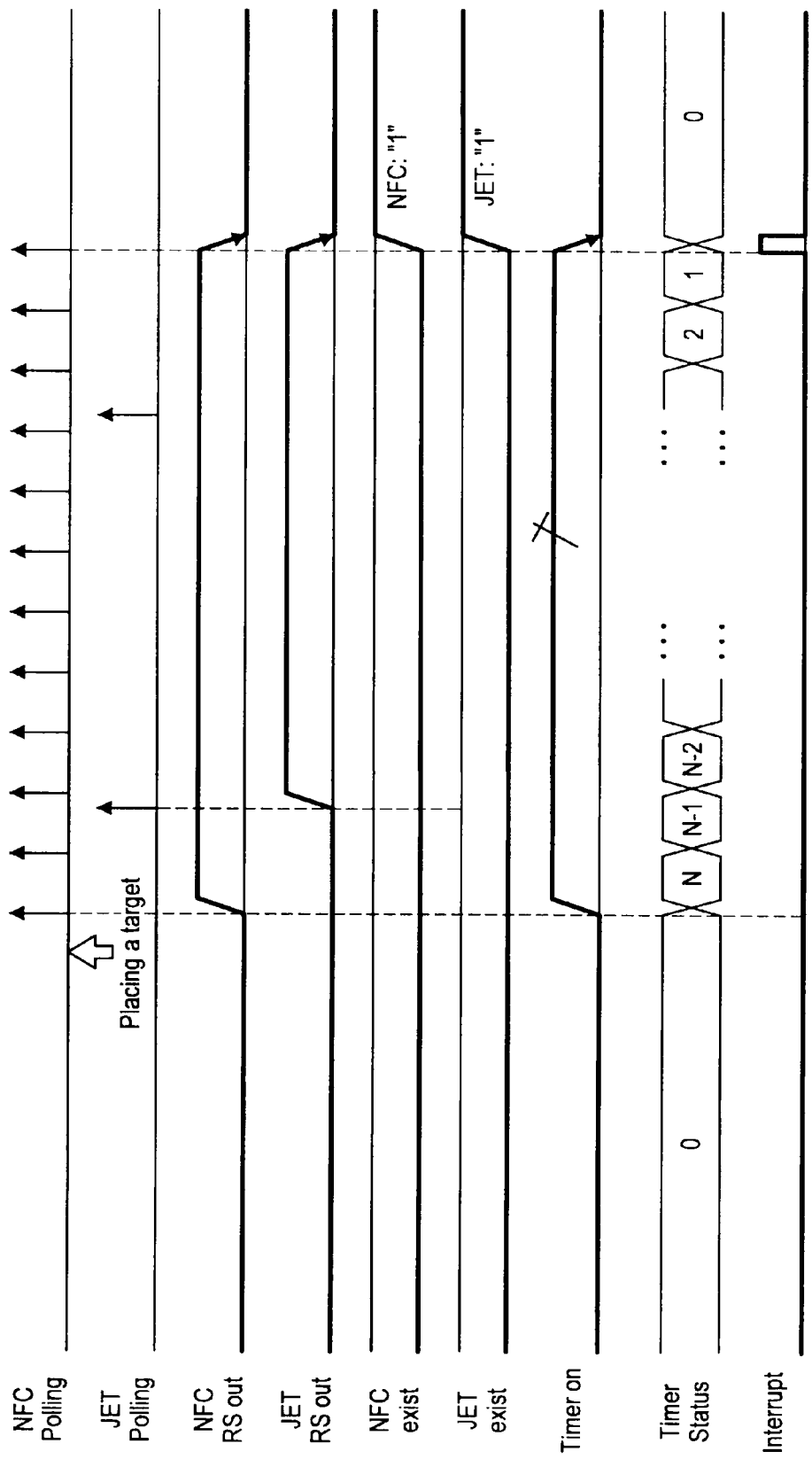
FIG. 16 is an explanatory diagram showing change over time in signals that are output at the time of operation of the target device according to the embodiment, and the change in the status of a timer that is used for determination of a proximity communication scheme.

In the example of FIG. 16, the NFC polling signal is received immediately after the time point of the target device 20 being placed over the counterpart device (Placing a Target). Thus, in the example of FIG. 16, the countdown by the down counter 236 is started at the reception timing of the NFC polling signal, and the signal indicating the operation of the timer (Timer on) becomes H level. Also, a signal of H level indicating the detection of the NFC polling signal is input at this time point from the NFC detection unit 222 to the S input of the RS flip-flop circuit 224. Thus, the output of the RS flip-flop circuit 224 (NFC RS out) rises at this timing. Also, the output of the RS flip-flop circuit 224 (NFC RS out) is input to the D input of the D flip-flop circuit 226.

Furthermore, in the example of FIG. 16, since the initiator device 10 that is compatible with both NFC and JET is assumed as the counterpart device, the JET polling signal is received after the NFC polling signal is received. When the JET polling signal is received, a signal of H level indicating the detection of the JET polling signal is input at this timing from the JET detection unit 228 to the S input of the RS flip-flop circuit 230. Thus, the output of the RS flip-flop circuit 230 (JET RS out) rises. Also, the output of the RS flip-flop circuit 230 (JET RS out) is input to the D input of the D flip-flop circuit 232.

The countdown by the down counter 236 continues during the processes described above, and the countdown stops in response to the signal of H level that is output from the zero detector 238 at the timing the count reaches 0. Furthermore, a polling interrupt signal (Interrupt) is output at the timing of the end of the countdown. Also, values held in the D flip-flop circuits 226 and 232 are output at this timing.

In the example of FIG. 16, input of H level is obtained from both the RS flip-flop circuits 224 and 230 before the count 0, and thus, the outputs of the D flip-flop circuits 226 and 232 are both at H level. Accordingly, the counterpart device can be determined to be a device that is compatible with both NFC and JET.

(2-7-2: (Case 2) NFC Detected+JET Non-Detected)

Next, reference will be made to FIG. 17. Here, an explanation will be given on a case (case 2) where the initiator device 12 is compatible with NFC only, as in the system configuration example shown in FIG. 7. According to this case, only the NFC polling signal is detected at the target device 20 before timeout.

When a process of detecting the compatible scheme of a counterpart device is started and the first polling signal (the NFC polling signal in the example of FIG. 17) is received, the down counter 236 is preset (Preset). And the status of the down counter 236 (Timer Status) is set to a specific value N. Also, since countdown by the down counter 236 is started at the timing of reception of the first polling signal, a signal indicating the operation of the timer (Timer on) remains at L level until the reception timing.

When the NFC polling is started by the initiator device 12, a signal indicating the reception timing of an NFC polling signal (NFC Polling) appears. However, in the example of FIG. 17, the JET polling is not performed by the initiator device 12, and thus a signal indicating the reception timing of a JET polling signal (JET Polling) does not appear. Additionally, in the drawing, a timing at which a JET polling signal is supposed to be received in case the JET polling is performed is shown with a dotted arrow.

Figure 17:
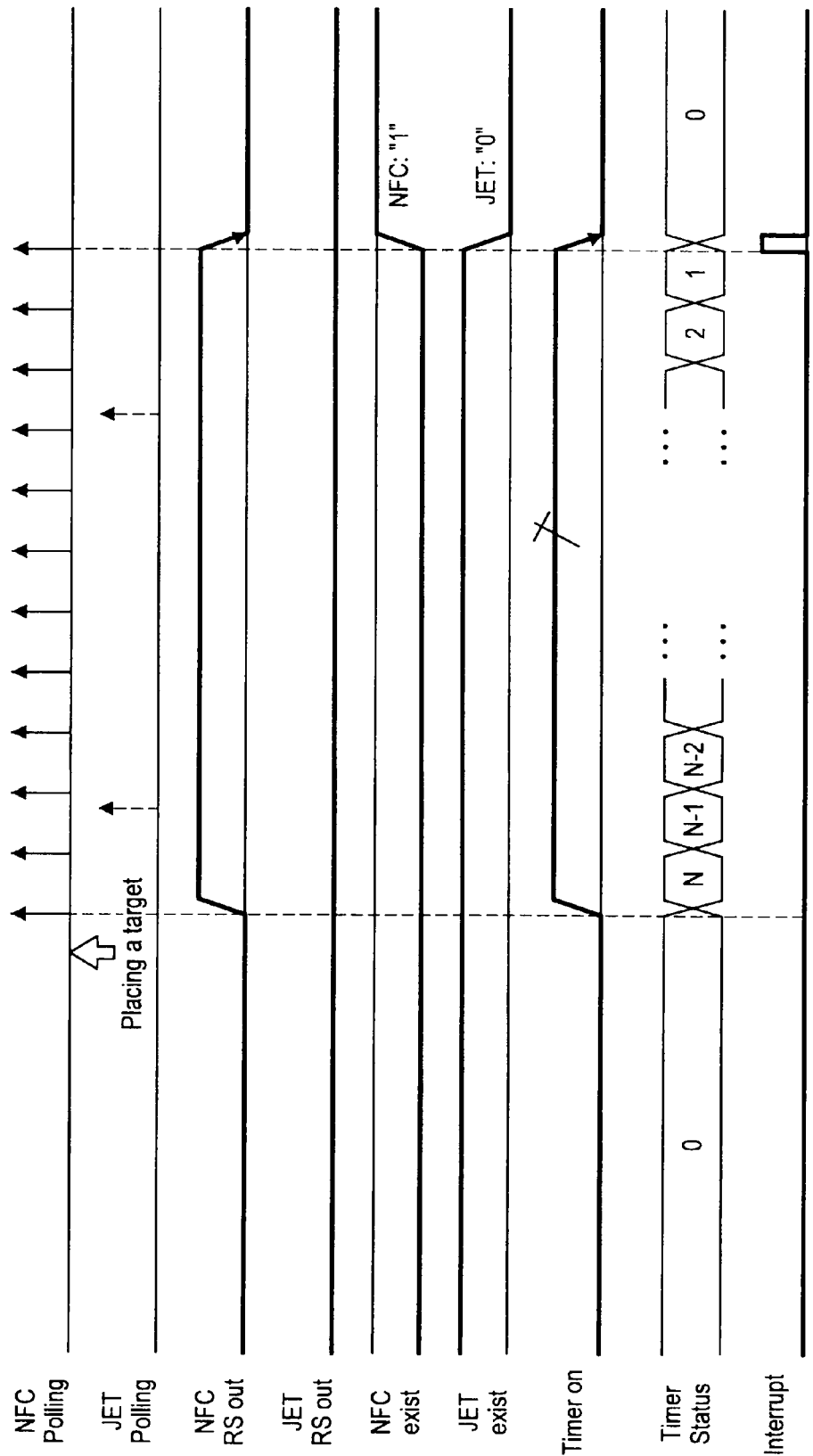
FIG. 17 is an explanatory diagram showing change over time in signals that are output at the time of operation of the target device according to the embodiment, and the change in the status of a timer that is used for determination of a proximity communication scheme.

In the example of FIG. 17, the NFC polling signal is received immediately after the time point of the target device 20 being placed over the counterpart device (Placing a Target). Thus, in the example of FIG. 17, the countdown by the down counter 236 is started at the reception timing of the NFC polling signal, and the signal indicating the operation of the timer (Timer on) becomes H level. Also, a signal of H level indicating the detection of the NFC polling signal is input at this time point from the NFC detection unit 222 to the S input of the RS flip-flop circuit 224. Thus, the output of the RS flip-flop circuit 224 (NFC RS out) rises at this timing. Also, the output of the RS flip-flop circuit 224 (NFC RS out) is input to the D input of the D flip-flop circuit 226.

Furthermore, in the example of FIG. 17, since the initiator device 12 that is compatible with NFC only is assumed as the counterpart device, the JET polling signal is not received after the receipt of the NFC polling signal. Thus, a signal of L level is input from the JET detection unit 228 to the S input of the RS flip-flop circuit 230. Accordingly, the output of the RS flip-flop circuit 230 (JET RS out) is maintained at L level. Also, the output of the RS flip-flop circuit 230 (JET RS out) is input to the D input of the D flip-flop circuit 232.

The countdown by the down counter 236 continues during the processes described above, and the countdown stops in response to the signal of H level that is output from the zero detector 238 at the timing the count reaches 0. Furthermore, a polling interrupt signal (Interrupt) is output at the timing of the end of the countdown. Also, values held in the D flip-flop circuits 226 and 232 are output at this timing.

In the example of FIG. 17, input of H level is obtained from the RS flip-flop circuit 224 before the count 0, and thus the output of the D flip-flop circuit 226 is at H level. On the other hand, input of L level is obtained from the RS flip-flop circuit 230 before the count 0, and thus the output of the D flip-flop circuit 232 is at L level. As a result, the counterpart device is determined to be a device that is compatible with NFC only.

(2-7-3: (Case 3) NFC Non-Detected+JET Detected)

Next, reference will be made to FIG. 18. Here, an explanation will be given on a case (case 3) where the initiator device 14 is compatible with JET only, as in the system configuration example shown in FIG. 8. According to this case, only the JET polling signal is detected at the target device 20 before timeout.

When a process of detecting the compatible scheme of a counterpart device is started and the first polling signal (the JET polling signal in the example of FIG. 18) is received, the down counter 236 is preset (Preset). And the status of the down counter 236 (Timer Status) is set to a specific value N. Also, since countdown by the down counter 236 is started at the timing of reception of the first polling signal, a signal indicating the operation of the timer (Timer on) remains at L level until the reception timing.

When the JET polling is started by the initiator device 14, a signal indicating the reception timing of a JET polling signal (JET Polling) appears. However, in the example of FIG. 18, the NFC polling is not performed by the initiator device 14, and thus a signal indicating the reception timing of an NFC polling signal (NFC Polling) does not appear. Additionally, in the drawing, a timing at which an NFC polling signal is supposed to be received in case the NFC polling is performed is shown with a dotted arrow.

Figure 18:
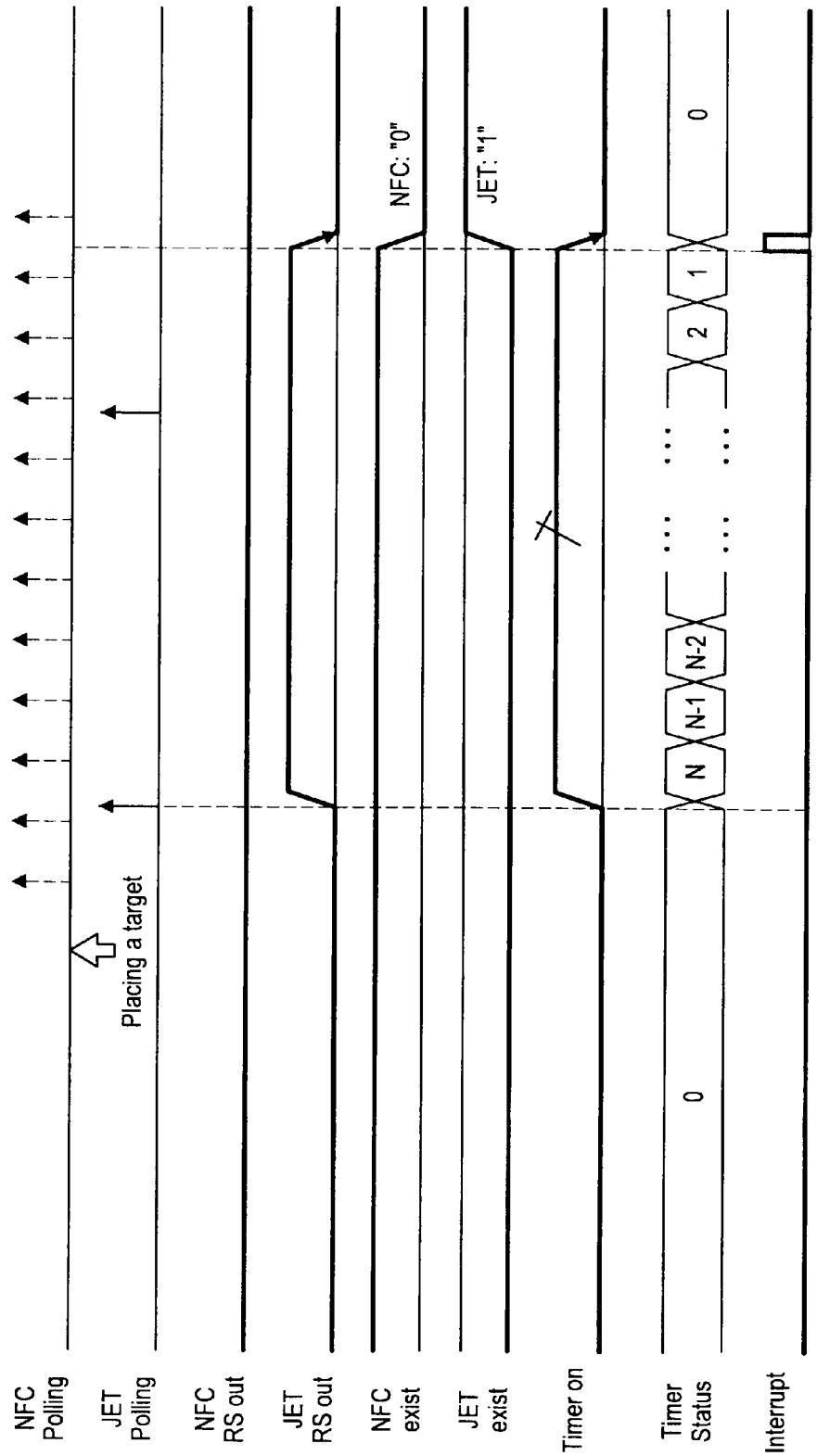
FIG. 18 is an explanatory diagram showing change over time in signals that are output at the time of operation of the target device according to the embodiment, and the change in the status of a timer that is used for determination of a proximity communication scheme.

In the example of FIG. 18, the JET polling signal is received immediately after the time point of the target device 20 being placed over the counterpart device (Placing a Target). Thus, in the example of FIG. 18, the countdown by the down counter 236 is started at the reception timing of the JET polling signal, and the signal indicating the operation of the timer (Timer on) becomes H level. Also, a signal of H level indicating the detection of the JET polling signal is input at this time point from the JET detection unit 228 to the S input of the RS flip-flop circuit 230. Thus, the output of the RS flip-flop circuit 230 (JET RS out) rises at this timing. Also, the output of the RS flip-flop circuit 230 (JET RS out) is input to the D input of the D flip-flop circuit 232.

Furthermore, in the example of FIG. 18, since the initiator device 14 that is compatible with JET only is assumed as the counterpart device, the NFC polling signal is not received. Thus, a signal of L level is input from the NFC detection unit 222 to the S input of the RS flip-flop circuit 224. Accordingly, the output of the RS flip-flop circuit 224 (NFC RS out) is maintained at L level. Also, the output of the RS flip-flop circuit 224 (NFC RS out) is input to the D input of the D flip-flop circuit 226.

The countdown by the down counter 236 continues during the processes described above, and the countdown stops in response to the signal of H level that is output from the zero detector 238 at the timing the count reaches 0. Furthermore, a polling interrupt signal (Interrupt) is output at the timing of the end of the countdown. Also, values held in the D flip-flop circuits 226 and 232 are output at this timing.

In the example of FIG. 18, input of L level is obtained from the RS flip-flop circuit 224 before the count 0, and thus the output of the D flip-flop circuit 226 is at L level. On the other hand, input of H level is obtained from the RS flip-flop circuit 230 before the count 0, and thus the output of the D flip-flop circuit 232 is at H level. As a result, the counterpart device is determined to be a device that is compatible with JET only.

Heretofore, an explanation has been given, in relation to the configuration of the target device 20, on the device configuration, the determination method of the scheme of a counterpart device, and the time chart (change over time in output signals, change in status of a timer). By adopting the configuration described above, a communication scheme with which a counterpart device is compatible can be accurately determined.

<2-8: Software Stack Configuration>

Here, the software stack configuration of the initiator device 10 will be described with reference to FIG. 19. FIG. 19 is an explanatory diagram showing an example of the software stack configuration of the initiator device 10. Additionally, an explanation will be given here with the initiator device 10 in mind, but a substantially same software stack configuration can be adopted by the target device 20 as well. Also, for the sake of explanation, a hardware layer 152 corresponding to the device configuration shown in FIG. 9 is also shown in FIG. 19.

Figure 19:
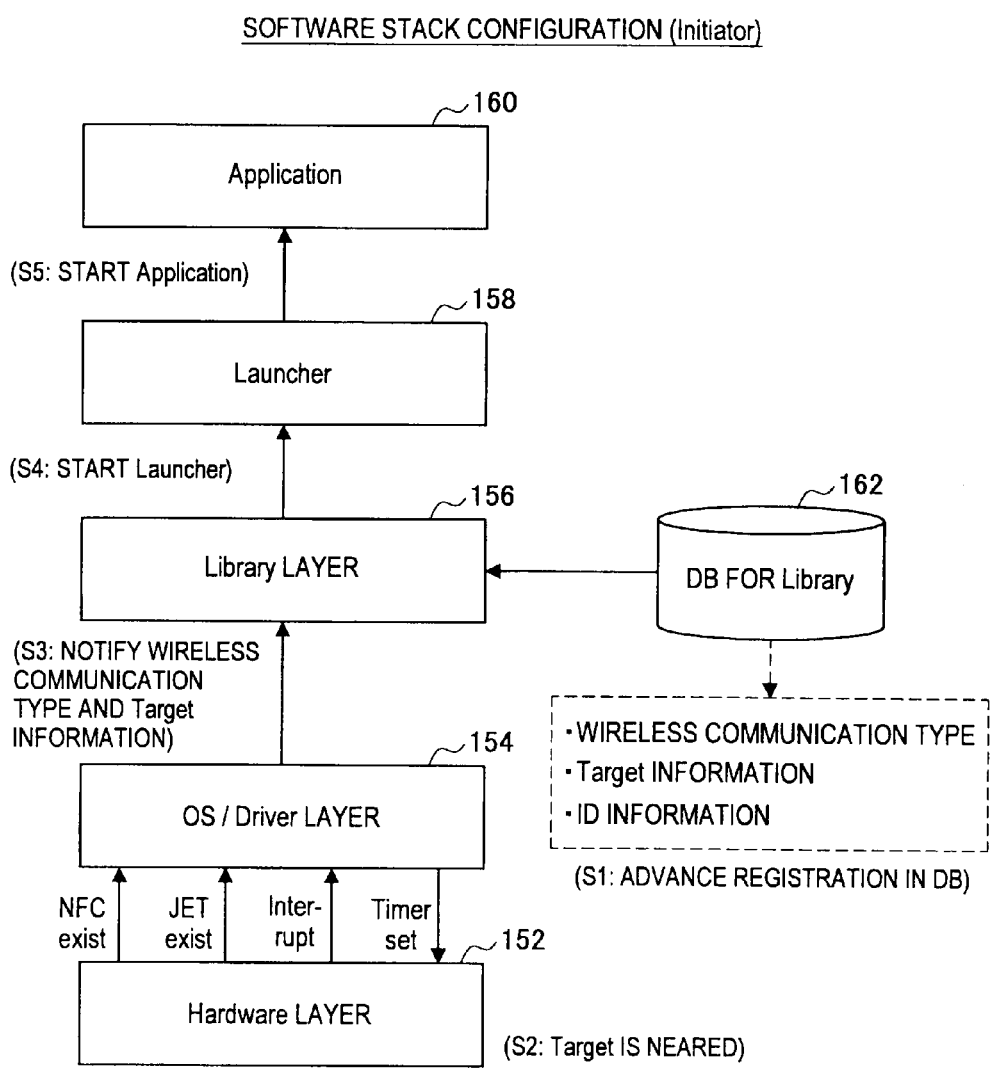
FIG. 19 is an explanatory diagram showing an example of a software stack configuration of the initiator device according to the embodiment.

As shown in FIG. 19, the software stack configuration of the initiator device 10 has a configuration where an OS/driver layer 154, a library layer 156, a launcher 154 and an application 160 are stacked on top of the hardware layer 152. Furthermore, a database 162 for library to be used by the library layer 156 is provided in this software stack configuration.

The hardware layer 152 corresponds to the configuration of the initiator device 10 shown in FIG. 9. Accordingly, when polling is started, a signal indicating the present/absence of NFC in the counterpart device (NFC exist) and a signal indicating the present/absence of JET in the counterpart device (JET exist) are output from the hardware layer 152. Also, a polling interrupt signal (Interrupt) is output from the hardware layer 152.

These signals (NFC exist, JET exist, Interrupt) that are output from the hardware layer 152 are input to the OS/driver layer 154. In contrast, a signal indicating the start of a process of detecting the scheme with which the counterpart device is compatible (Timer set (Detect Start)) is input from the OS/driver layer 154 to the hardware layer 152. The timer of the hardware layer 152 is set according to this signal.

As described above, the polling interrupt signal (Interrupt), NFC detection information (NFC exist), and JET detection information (JET exist) are input to the OS/driver layer 154. Accordingly, the OS/driver layer 154 refers to the NFC detection information and the JET detection information at the timing the polling interrupt signal is input, and acquires the wireless communication type of the counterpart device (NFC (Type-A)/NFC(Type-B)/NFC(FeliCa(registered trademark of Sony Corporation)/JET) and target information and notifies the same to the library layer 156.

Additionally, the target information here includes, for example, an identification code (SystemCode) of a system administrator that manages the method of storing data in the counterpart device (System), an identification code (Service-Code1, ServiceCode2, . . . ) indicating the type of a service provided with the use of data stored in the counterpart device, or the like. However, the configuration of the target information may be different for each wireless communication type. Also, the wireless communication type and the target information are stored in advance in the database 162 for library together with specific ID information, as shown in FIG. 20. The specific ID information here is information indicating an application associated with the target information (for example, an application name or the like), and is used at the time of start of the application.

When the wireless communication type and the target information are input from the OS/driver layer 154 to the library layer 156, the library layer 156 extracts the ID information corresponding to the input wireless communication type and the input target information from the database 162 for library. Then, the launcher 158 is started, and the ID information extracted from the database 162 for library is notified to the launcher 158 that has been started. When the ID information is notified, the launcher 158 starts the application 160 that is specified by the ID information. Then, an appropriate service corresponding to the wireless communication type of the counterpart device, or the like, is provided by the application 160.

As described above, it is necessary to first register the wireless communication type, the target information, and the ID information in the database 162 for library (S1). Then, when a counterpart device is placed over (S2), the NFC detection information, the JET detection information, and the polling interrupt information are input from the hardware layer 152 to the OS/driver layer 154, and the wireless communication type and the target information are notified by the OS/driver layer 154 to the library layer 156 (S3). Then, the ID information is specified at the library layer 156, and the launcher 158 is started (S4). The ID information is notified to the launcher 158 that has been started, and the application 160 corresponding to the ID information is started by the launcher 158 (S5). The application 160 is started in this manner in the software stack configuration illustrated in FIG. 19.

(More Detailed Flow of Processes)

Here, the flow of processes up to the start of the application 160 will be described in greater detail with reference to FIG. 21.

Figure 21:
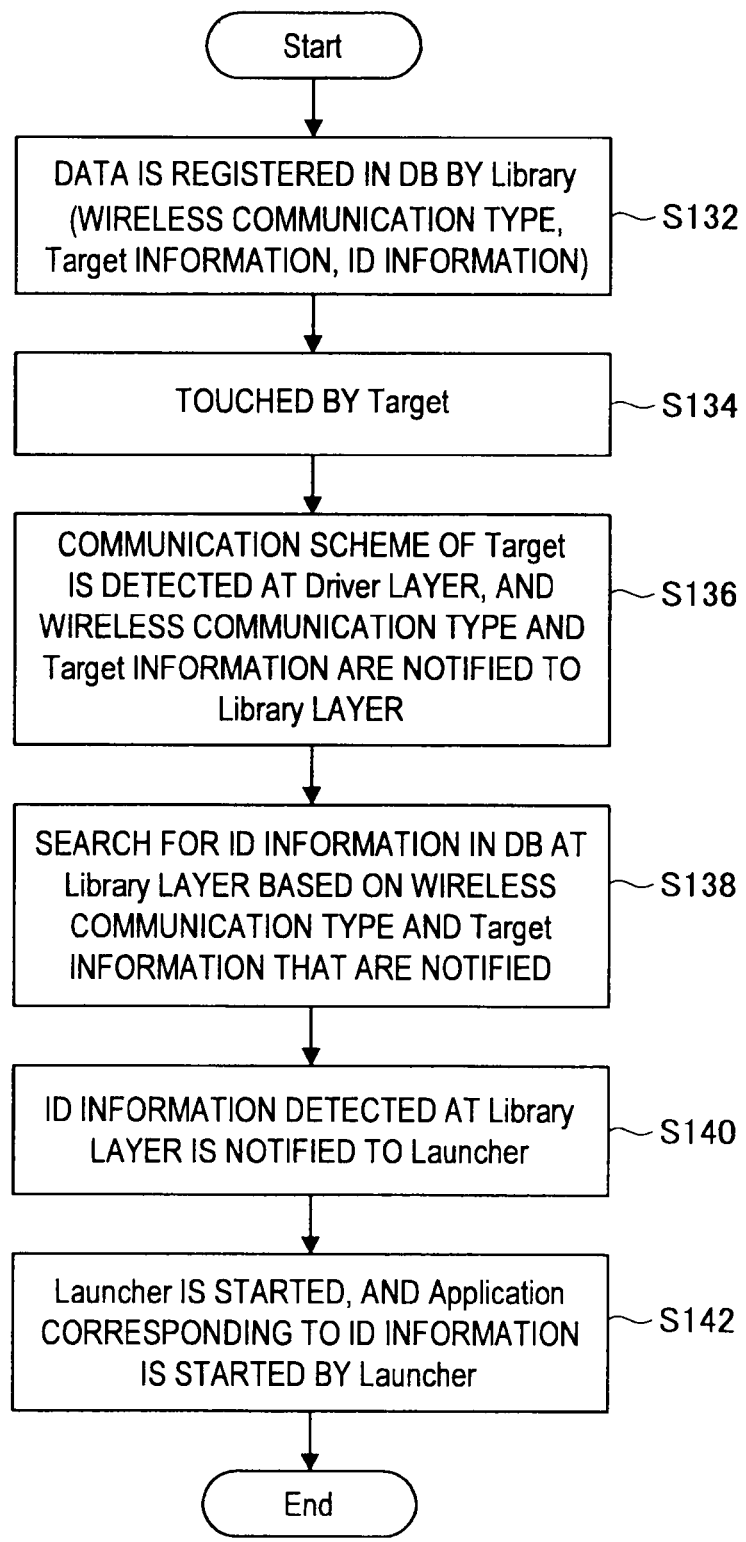
FIG. 21 is an explanatory diagram showing a flow of activation process of a launcher and an application included in the software stack configuration of the initiator device according to the embodiment.

As shown in FIG. 21, first, data is registered in the database 162 for library by the library layer 156 (S132). At this time, the wireless communication type, the target information, and the ID information are registered in association with each other in the database 162 for library, as shown in FIG. 20. Next, when a counterpart device (Target) is placed over (S134), a process of detecting the compatible scheme of the counterpart device is started by the OS/driver layer 154, and the wireless communication type and the target information as the detection result are input to the library layer 156 (S136). At this time, the OS/driver layer 154 obtains the detection result by inputting a signal (Timer set) indicating the start of the detection process to the hardware layer 152 and by acquiring the NFC detection signal, the JET detection signal, and the polling interrupt signal that are output from the hardware layer 152.

When the wireless communication type and the target information are notified to the library layer 156, the ID information is searched from the database 162 for library based on the wireless communication type and the target information that have been notified (S138). Then, the ID information detected by the search process of step S138 is notified to the launcher 158 (S140). At this time, when the launcher 158 is started and the ID information is notified to the launcher 158 that has been started, the application 160 corresponding to the ID information is started by the launcher 158 (S142). In this manner, the launcher 158 and the application 160 are started based on the counterpart device's compatible scheme detected by the hardware layer 152.

Heretofore, the software stack configuration of the initiator device 10 has been described. As described above, the initiator device 10 of the present embodiment can determine the compatible scheme of the counterpart device based on the output of the hardware layer 152, and thus it becomes possible to construct software that manages driver processes for the compliance with a plurality of schemes in an integrated manner. Additionally, in the example described above, an explanation has been given taking two proximity communication schemes, i.e. NFC and JET, as examples, but it is also possible to apply the present embodiment to a system in which three or more proximity communication schemes are present in a mixed manner. Of course, it is needless to say that such application is also within the technical scope of the present embodiment.

<2-9: Hardware Configuration Example>

Figure 22:
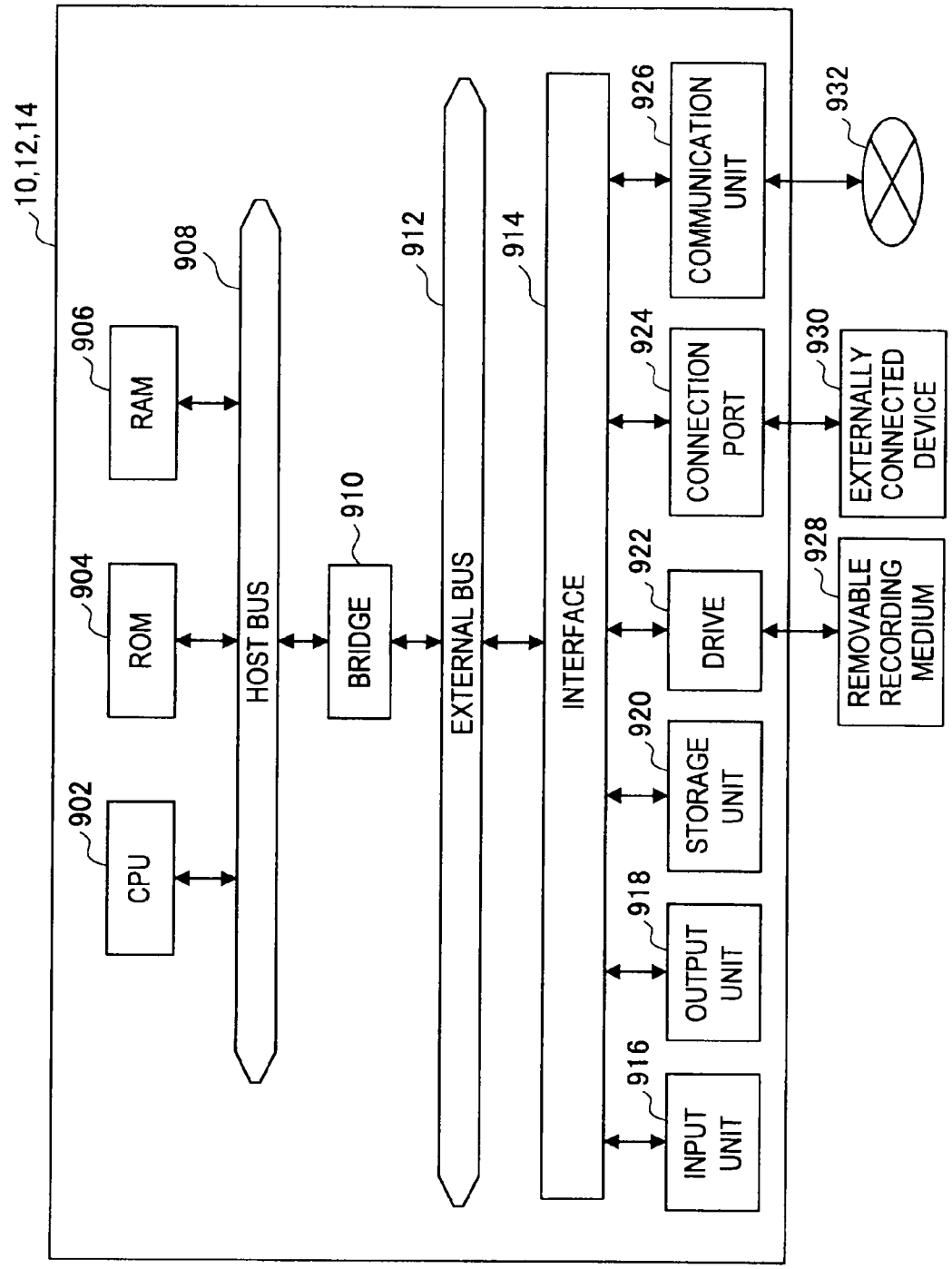
FIG. 22 is an explanatory diagram showing an example of a hardware configuration that is capable of realizing the determination process of the proximity communication scheme, the launcher activation process, the application activation process, and the like, by the initiator device according to the embodiment.

The functions of the initiator devices 10, 12, and 14, and the functions of the target devices 20, 22, and 24 described above can be realized, for example, by using the hardware configuration of an information processing apparatus shown in FIG. 22. That is, the function of each structural element is realized by controlling the hardware shown in FIG. 22 by using a computer program. The mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 22, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transfer. For its part, the host bus 908 is connected through the bridge 910 to the external bus 912 whose data transfer speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. As a matter of course, the removal recording medium 928 may be, for example, an IC card on which a non-contact IC chip is mounted, or an electronic device. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

It should be understood by those skilled in the art that various modifications, combinations, sub-combinations and alterations may occur depending on design requirements and other factors insofar as they are within the scope of the appended claims or the equivalents thereof.

For example, in case timeout is reached at the initiator device 10 shown in FIG. 9 without the NFC response signal being detected, the NFC communication unit 104 may be stopped. Furthermore, in case timeout is reached at the initiator device 10 shown in FIG. 9 without the JET response signal being detected, the JET communication unit 108 may be stopped. With such configuration, power supply to unused structural element can be stopped, and the power consumption of the initiator device 10 can be reduced. Additionally, such power control is realized by the functions of the NFC communication unit 104, the JET communication unit 108, and the CPU 902 described above, for example.

Similarly, in case timeout is reached at the target device 20 shown in FIG. 14 without the NFC polling signal being detected, the NFC communication unit 204 may be stopped.

Furthermore, in case timeout is reached at the target device 20 shown in FIG. 14 without the JET polling signal being detected, the JET communication unit 208 may be stopped. With such configuration, power supply to unused structural element can be stopped, and the power consumption of the target device 20 can be reduced. Additionally, such power control is realized by the functions of the NFC communication unit 204, the JET communication unit 208, and the CPU 902 described above, for example.

Furthermore, as another example, the information indicating the counterpart device's compatible scheme detected at the initiator device 10 shown in FIG. 9 may be displayed on a display device not shown. Similarly, the information indicating the counterpart device's compatible scheme detected at the target device 20 shown in FIG. 14 may be displayed on a display device not shown. Additionally, such configuration is realized by the output unit 918 described above.

The above explanation was given, taking a device compatible with the NFC scheme and the JET scheme, on a method of determining the compatible scheme of a counterpart device and of starting the launcher and the application according to the determination result. However, these examples are illustrated to help better understanding of the technology according to the present embodiment, and can be applied to other proximity communication schemes or a so-called non-contact communication scheme. Furthermore, these examples can also be applied to a case where there are three or more types of proximity communication schemes. In this case, a device is provided with three or more types of communication means. For example, in the case of a device compatible with JET, NFC, and a third communication scheme having a polling cycle longer than that of JET, this device transmits polling signals corresponding to these three types of schemes, stands by for a period longer than the polling cycle of the third communication scheme and waits for the reception of response signals, and determines the compatible scheme of a counterpart device according to the reception result of response signals received during the period. In this manner, the determination method for NFC and JET described above can be extended to cover three types of communication schemes. Of course, it can be extended to cover four or more types of communication schemes. Additionally, also in case of the determination method being extended to cover three or more types of communication schemes, the determination result is notified to a launcher and can be used for selecting an application or for controlling the start of the application.

(Note)

The initiator device 10 is an example of a communication device. The NFC communication unit 104 is an example of a first communication unit. The JET communication unit 108 is an example of a second communication unit. The NFC is an example of a first scheme. The JET is an example of a second scheme. The detector 110, the OR circuit 130, the RS flip-flop circuits 124, 128, and 132, the down counter 134, the zero detector 136, a part or all of the OS/driver layer 154 are examples of a scheme determination unit. The NFC communication unit 104, the JET communication unit 108, and the CPU 902 are examples of an operation control unit. The output unit 918 is an example of a display unit. The library layer 156 is an example of a launcher starting unit. Additionally, the function of the library layer 156 is realized by the CPU 902.

The present application contains subject matter related to that disclosed in Japanese Priority Patent Application JP 2009-173116 filed in the Japan Patent Office on Jul. 24, 2009, the entire content of which is hereby incorporated by reference.

What is claimed is:

1. A communication device comprising:
circuitry configured to
send a first polling signal in a specific polling cycle and receive a first response signal sent from a counterpart device in response to the first polling signal, based on a first scheme;
send a second polling signal in a longer polling cycle than the first polling signal and receive a second response signal sent from the counterpart device in response to the second polling signal, based on a second scheme; and
wait for reception of one of the first and second response signal from a time point of the other one of the first and second response signal being received for a predetermined period of time longer than the polling cycle of the second polling signal, and determine a scheme usable by the counterpart device based on the reception result.

2. The communication device according to claim 1, further comprising:
circuitry configured to stop operation of the communication device compatible with a scheme not usable by the counterpart device, in case the scheme usable by the counterpart device is determined to be one of the first and the second schemes.

3. The communication device according to claim 2, further comprising:
a display that displays information about the scheme usable by the counterpart device based on a determination result.

4. The communication device according to claim 1, wherein the circuitry is configured to wait, in case the first response signal is received, for reception of the second response signal for the predetermined period of time from a time point of the reception of the first response signal, determine, in case the second response signal is received, that the schemes usable by the counterpart device are the first and the second schemes, and determine, in case the second response signal is not received, that the scheme usable by the counterpart device is the first scheme only.

5. The communication device according to claim 4, wherein the the circuitry is configured to wait, in case the second response signal is received, for reception of the first response for the predetermined period of time from a time point of the second reception of the response signal, determine, in case the first response signal is received, that the schemes usable by the counterpart device are the first and the second schemes, and determine, in case the first response signal is not received, that the scheme usable by the counterpart device is the second scheme only.

6. The communication device according to claim 1, wherein the first scheme is a NFC (Near Field Communication) scheme, and wherein the second scheme is a TransferJet scheme.

7. The communication device according to claim 1, further comprising:
circuitry configured to start a first-scheme launcher that is for starting an application compatible with the first scheme or a second-scheme launcher that is for starting an application compatible with the second scheme, depending on a determination result of the waiting.

8. The communication device according claim 1, further comprising:
circuitry configured to send a third polling signal in a longer polling cycle than the second polling signal and receives a third response signal sent from the counterpart device in response to the third polling signal, based on a third scheme, wherein the circuitry is configured to wait for reception of the first, second, or third response signal for a predetermined period of time longer than the polling cycle of the third polling signal from a time point of any of the first, second, and third response signal being received, and determine a scheme usable by the counterpart device based on the reception result.

9. The communication device according to claim 1, wherein the first polling signal and the second polling signal are sent substantially simultaneously.

10. A communication scheme determination method comprising:
sending a first polling signal of a first scheme in a specific polling cycle and sending a second polling signal of a second scheme in a longer polling cycle than the first scheme;
receiving a response signal of the first or the second scheme sent from a counterpart device in response to the first and second polling signals sent in the sending; and
waiting for reception of one of the response signal of the second or the first scheme from a time point of the other one of the response signal of the second or the first scheme being received for a predetermined period of time longer than the polling cycle of the second scheme, and determining a scheme usable by the counterpart device based on the reception result.

11. The communication scheme determination method according to claim 10, wherein the first polling signal and the second polling signal are sent substantially simultaneously.

12. A non-transitory recording medium encoded with a program for causing a computer to realize a method comprising:
sending a first polling signal of a first scheme in a specific polling cycle and sending a second polling signal of a second scheme in a longer polling cycle than the first scheme;
receiving a response signal of the first or the second scheme sent from a counterpart device in response to the first and second polling signals sent in the sending; and
waiting for reception of one of the response signal of the second or the first scheme from a time point of the other one of the response signal of the second or the first scheme being received for a predetermined period of time longer than the polling cycle of the second scheme, and determining a scheme usable by the counterpart device based on the reception result.

13. The recording medium according to claim 12, wherein the first polling signal and the second polling signal are sent substantially simultaneously.

* * * * *